United States Patent
Kim et al.

(10) Patent No.: US 9,894,656 B2
(45) Date of Patent: Feb. 13, 2018

(54) METHOD AND APPARATUS FOR TRANSCEIVING DATA IN A WIRELESS COMMUNICATION SYSTEM WHICH SUPPORTS A PLURALITY OF COMPONENT CARRIERS

(71) Applicant: LG ELECTRONICS INC., Seoul (KR)

(72) Inventors: Soyeon Kim, Anyang-si (KR); Sungho Moon, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/244,978

(22) Filed: Aug. 23, 2016

(65) Prior Publication Data

US 2016/0360535 A1 Dec. 8, 2016

Related U.S. Application Data

(63) Continuation of application No. 14/216,564, filed on Mar. 17, 2014, now Pat. No. 9,455,813, which is a
(Continued)

(30) Foreign Application Priority Data

Jan. 24, 2011 (KR) .................. 10-2011-0007017

(51) Int. Cl.
*H04J 3/24* (2006.01)
*H04W 72/04* (2009.01)
(Continued)

(52) U.S. Cl.
CPC ....... *H04W 72/0453* (2013.01); *H04L 1/0038* (2013.01); *H04L 5/001* (2013.01);
(Continued)

(58) Field of Classification Search
CPC ..... H04W 72/04; H04W 88/08; H04W 76/00; H04W 84/08; H04W 76/02; H04W 84/12;
(Continued)

(56) References Cited

U.S. PATENT DOCUMENTS 8,305,986 B2 11/2012 Zhang et al.
8,463,262 B2 6/2013 Kwon et al.
(Continued)

OTHER PUBLICATIONS

PCT International Application No. PCT/KR2011/000746, International Search Report dated Nov. 7, 2011, 2 pages.
(Continued)

*Primary Examiner* — Brenda H Pham
(74) *Attorney, Agent, or Firm* — Lee, Hong, Degerman, Kang & Waimey

(57) ABSTRACT

The present disclosure relates to an operating method of a terminal for transceiving data to/from a base station in a system that supports a plurality of component carriers. The method includes receiving, from the base station, downlink control information (DCI) masked using a terminal identifier (cell-radio network temporary identifier (C-RNTI)) or a semi-persistent scheduling terminal identifier (SPS C-RNTI) through a physical downlink control channel (PDCCH); determining a component carrier for transceiving data to/from the base station; and transceiving data to/from the base station through the determined component carrier. The determining includes determining the component carrier which has received the PDCCH as a component carrier for receiving downlink data, and determining an uplink component carrier linked with the component carrier which has received the PDCCH as a component carrier for transmitting uplink data.

12 Claims, 18 Drawing Sheets

Related U.S. Application Data continuation of application No. 13/521,704, filed as application No. PCT/KR2011/000746 on Feb. 1, 2011, now Pat. No. 8,718,002.

(60) Provisional application No. 61/302,497, filed on Feb. 8, 2010, provisional application No. 61/301,221, filed on Feb. 4, 2010, provisional application No. 61/301,218, filed on Feb. 4, 2010.

(51) Int. Cl.
| | | |
|---|---|---|
| *H04L 5/00* | (2006.01) | |
| *H04L 1/00* | (2006.01) | |
| *H04W 92/10* | (2009.01) | |
| *H04W 88/02* | (2009.01) | |

(52) U.S. Cl.
CPC .......... *H04L 5/0044* (2013.01); *H04L 5/0053* (2013.01); *H04L 5/0055* (2013.01); *H04L 5/0094* (2013.01); *H04W 72/042* (2013.01); *H04W 72/048* (2013.01); *H04W 72/0413* (2013.01); *H04W 88/02* (2013.01); *H04W 92/10* (2013.01)

(58) Field of Classification Search
CPC ......... H04W 72/0406; H04W 72/0453; H04W 74/04; H04W 72/048; H04W 92/10
USPC ................ 370/330, 349, 329, 341, 431, 464
See application file for complete search history.

(56) References Cited

U.S. PATENT DOCUMENTS

| | | | |
|---|---|---|---|
| 8,467,341 | B2 | 6/2013 | Kim et al. |
| 8,477,699 | B2 | 7/2013 | Damnjanovic et al. |
| 8,718,002 | B2 | 5/2014 | Kim et al. |
| 8,934,417 | B2 | 1/2015 | Nory et al. |
| 9,455,813 | B2 * | 9/2016 | Kim ................... H04W 72/0453 |
| 2009/0300456 | A1 | 12/2009 | Pelletier et al. |
| 2009/0316659 | A1 | 12/2009 | Lindoff et al. |
| 2010/0118720 | A1 | 5/2010 | Gauvreau et al. |
| 2010/0303011 | A1 | 12/2010 | Pan et al. |
| 2010/0322158 | A1 | 12/2010 | Lee et al. |
| 2011/0021191 | A1 | 1/2011 | Damnjanovic et al. |
| 2011/0141941 | A1* | 6/2011 | Lee ........................ H04L 1/0038 370/252 |
| 2011/0299489 | A1 | 12/2011 | Kim et al. |
| 2012/0009963 | A1 | 1/2012 | Kim et al. |

OTHER PUBLICATIONS

HT mMobile Inc., "Discussion on DL/UL CC linkage for Carrier Aggregation," 3GPP TSG-RAN WG2 #68bis, R2-100573, Jan. 2010, 4 pages.

Panasonic, "Further Discussion on PDCCH with cross carrier operation," 3GPP TSG-RAN WG1 #59bis, R1-100361, Jan. 2010, 6 pages.

* cited by examiner

FIG. 3
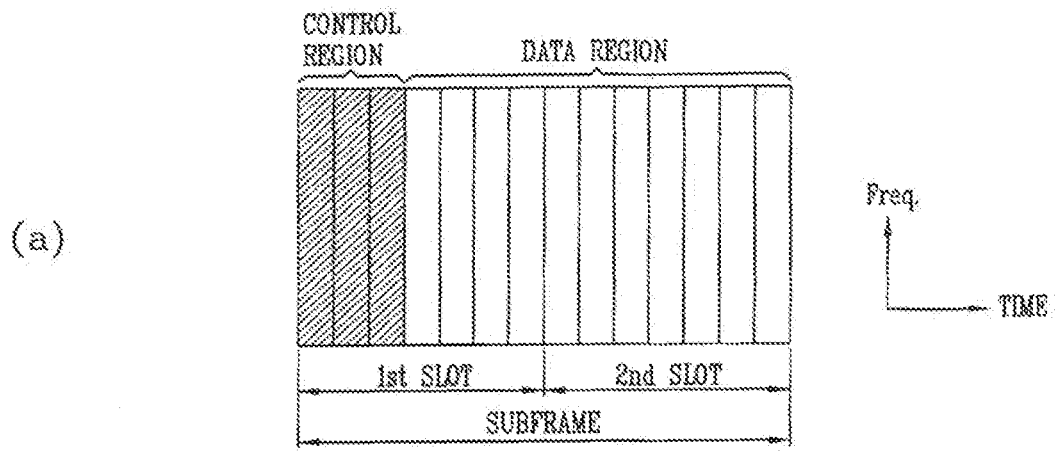
(a)
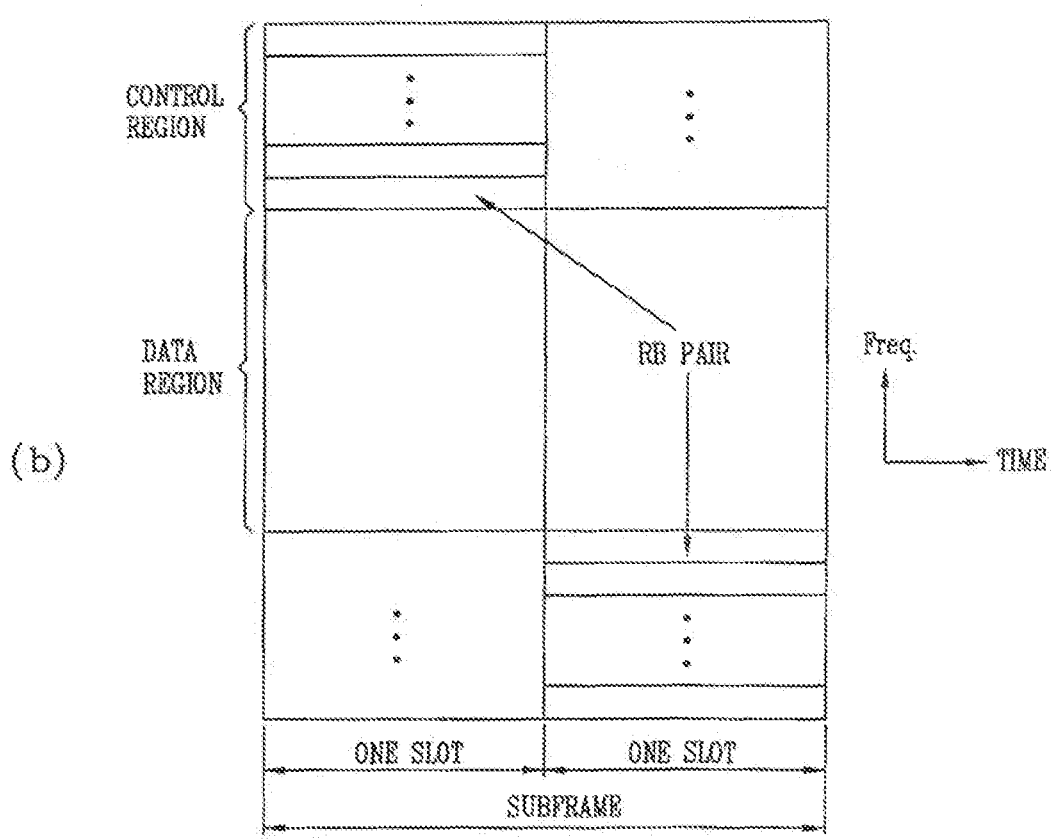
(b)

METHOD AND APPARATUS FOR TRANSCEIVING DATA IN A WIRELESS COMMUNICATION SYSTEM WHICH SUPPORTS A PLURALITY OF COMPONENT CARRIERS

CROSS-REFERENCE TO RELATED APPLICATIONS

This application is a continuation of U.S. patent application Ser. No. 14/216,564, filed on Mar. 17, 2014, now U.S. Pat. No. 9,455,813, which is a continuation of U.S. patent application Ser. No. 13/521,704, filed on Apr. 23, 2013, now U.S. Pat. No. 8,718,002, which is the National Stage filing under 35 U.S.C. 371 of International Application No. PCT/KR2011/000746, filed on Feb. 1, 2011, which claims the benefit of earlier filing date and right of priority to Korean Application No. 10-2011-0007017, filed on Jan. 24, 2011, and also claims the benefit of U.S. Provisional Application No. 61/302,497, filed on Feb. 8, 2010, 61/301,221, filed on Feb. 4, 2010, and 61/301,218, filed on Feb. 4, 2010, the contents of which are all hereby incorporated by reference herein in their entirety.

TECHNICAL FIELD

The present disclosure relates to wireless communication, and more particularly, to a method and apparatus for transceiving data in a wireless communication system which supports a plurality of component carriers.

BACKGROUND ART

3rd generation partnership project (3GPP) long term evolution (hereinafter, referred to as 'LTE') and LTE-advanced (hereinafter, referred to as 'LTE-A') communication systems will be schematically described as examples of mobile communication systems applicable to the present disclosure proposed in the specification.

One or more cells exist in one base station. One cell is set to one of bandwidths of 1.25 MHz, 2.5 MHz, 5 MHz, 10 MHz, 15 MHz and 20 MHz with respect to one carrier so as to provide a downlink/uplink transmission service to several user equipments (UEs). In this case, different cells may be set to provide different bandwidths. One base station controls data transmission/reception for a plurality of UEs. The base station transmits downlink (DL) scheduling information of DL data to a corresponding UE so as to inform the corresponding UE of information related to time/frequency domains to which data is to be transmitted, encoding, data size, hybrid automatic repeat request (HARQ), etc. The base station transmits uplink (UL) scheduling information of UL data to the corresponding UE so as to inform the corresponding UE of information related to time/frequency domains that can be used by the corresponding UE, encoding, data size, HARQ, etc. An interface for transmitting user traffic or control traffic may be used between base stations.

Although radio communication technology has been developed up to LTE based on wiideband code division multiple access (WCDMA), the demands and expectations of users and providers continue to increase. Since other radio access technologies have also been continuously developed, new technology evolution is required to secure high competitiveness in the future. The new technology requires decrease in cost per bit, increase in service availability, flexible use of a frequency band, simple structure, open interface, suitable UE power consumption, etc.

Recently, the standardization of the subsequent technology of the LTE is ongoing in the 3GPP. In this specification, the technology is called as 'LTE-A.'

The LTE and LTE-A systems are different from each other in terms of system bandwidths and introduction of relays.

The LTE-A system aims to support a wideband of a maximum of 100 MHz. To this end, the LTE-A system uses carrier aggregation or bandwidth aggregation technology which achieves the wideband using a plurality of frequency blocks. The carrier aggregation enables the plurality of frequency blocks to be used as one large logical frequency band in order to use a wider frequency band. The bandwidth of each of the frequency blocks may be defined based on the bandwidth of a system block used in the LTE system. Each of the frequency blocks is transmitted using a component carrier.

As the carrier aggregation technology is used in the LTE-A system that is a next-generation communication system, it is required to develop a method in which a UE receives a signal from a base station or relay in a system supporting a plurality of carriers.

DISCLOSURE OF THE INVENTION

Therefore, an object of the present disclosure is to provide a method and apparatus for configuring cross-carrier scheduling according to the presence of application of CIF to UE-specific downlink control information transmitted to a common search space in a system which supports a plurality of component carriers.

Another object of the present disclosure is to provide a method and apparatus for determining the presence of cross-scheduling of PDCCH related to semi-persistent scheduling (SPS) transmission regardless of the kind of SS to which the PDCCH is transmitted and applying CIF.

To achieve these and other advantages and in accordance with the purpose of the present disclosure, as embodied and broadly described herein, there is provided an operating method of a terminal for transceiving data to/from a base station in a system which supports a plurality of component carriers, the method including: receiving, from the base station, downlink control information (DCI) masked using a terminal identifier (cell-radio network temporary identifier (C-RNTI)) or a semi-persistent scheduling terminal identifier (SPS C-RNTI) through a physical downlink control channel (PDCCH); determining a component carrier for transceiving data to/from the base station; and transceiving data to/from the base station through the determined component carrier, wherein the determining includes determining the component carrier which has received the PDCCH as a component carrier for receiving downlink data, and determining an uplink component carrier linked with the component carrier which has received the PDCCH as a component carrier for transmitting uplink data.

The DCI masked using the terminal identifier may be transmitted to a common search space.

The DCI may not contain a carrier indicator field (CIF).

The DCI may be a downlink format for physical uplink shared channel (PUSCH) scheduling or a downlink format for simple scheduling of one physical downlink shared channel (PDSCH) code-word.

The receiving of the DCI may include receiving a control region through at least one of the plurality of component carriers from the base station, and performing blind decoding on the control region.

The performing of the blind decoding may include performing blind decoding on a common search space of a primary component carrier or a downlink component carrier in a PDCCH monitoring set.

The component carrier which has received the PDCCH may be linked with at least one uplink component carrier.

To achieve these and other advantages and in accordance with the purpose of the present disclosure, as embodied and broadly described herein, there is provided a terminal for transceiving data to/from a base station in a system which supports a plurality of component carriers, the terminal including: a radio frequency (RF) unit for transceiving a radio signal to/from an outside thereof; and a control unit connected to the RF unit, wherein the control unit controls the RF unit to receive, from the base station, DCI masked using a terminal identifier C-RNTI) or a semi-persistent scheduling terminal identifier (SPS C-RNTI) through a PDCCH, wherein the control unit controls the terminal to determine the component carrier which has received the PDCCH as a component carrier for receiving downlink data and to determine an uplink component carrier linked with the component carrier which has received the PDCCH as a component carrier for transmitting uplink data, and wherein the control unit controls the RF unit to transceive data to/from the base station through the determined component carrier.

The control unit may control the RF unit to receive a control region through at least one of the plurality of component carriers from the base station, and control the terminal to perform blind decoding on the control region.

The control unit may control the terminal to perform blind decoding on a common search space of a primary component carrier or a downlink component carrier in a PDCCH monitoring set.

As described above, the present disclosure provides a method for allowing CIF to be contained in the UE-specific downlink control information transmitted to the common search space and applying the CIF, so that it is possible to reduce reception complexity by transmitting PDSCH and PUSCH through a predetermined CC.

It should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

FIG. 3 is a diagram illustrating the structures of a downlink subframe and an uplink subframe used in the 3GPP LTE system;

MODES FOR CARRYING OUT THE PREFERRED EMBODIMENTS

Figure 1:
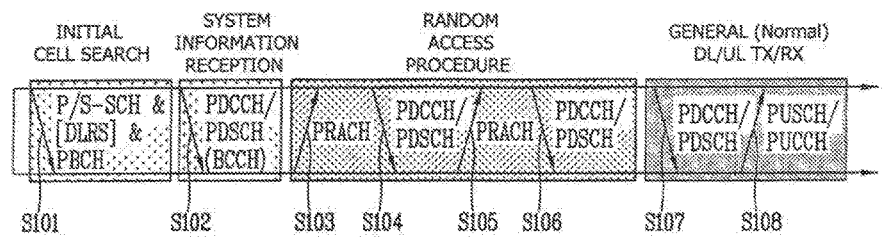
FIG. 1 is a diagram illustrating physical channels used in a 3GPP LTE system and a general signal transmission method using the physical channels.

Reference will now be made in detail to the preferred embodiments of the present disclosure, examples of which are illustrated in the accompanying drawings. It will also be apparent to those skilled in the art that various modifications and variations can be made in the present disclosure without departing from the spirit or scope of the invention. Thus, it is intended that the present disclosure cover modifications and variations of this invention provided they come within the scope of the appended claims and their equivalents. For example, although a case in which mobile communication systems of the present disclosure are 3GPP LTE and LTE-A systems will be described in detail, the present disclosure may be applied to other mobile communication systems, except some specific items of the 3GPP LTE and LTE-A systems.

To prevent ambiguity in the concept of the present disclosure, structures and apparatuses of the known art will be omitted, or will be shown in the form of a block diagram based on main functions of each structure and apparatus. Like reference numerals indicate like elements throughout the specification and drawings.

In the following descriptions, it is assumed that the term "terminal" is generally called as a mobile or stationary user device such as a user equipment (UE), mobile station (MS) or advanced mobile station (AMS). Also, it is assumed that the term "base station" is generally called as an arbitrary node in a network communicating with the terminal, such as a Node B, eNode B, base station (BS) or access point (AP). The term "relay" may be called as s relay node (RN), a relay station (RS), etc.

In the mobile communication system, the UE or relay may receive information from the BS through a downlink (DL), and may transmit information to the BS through an uplink (UL). Data and various control information are used as the information transmitted or received by the UE or relay, and various physical channels exist according to the kind and usage of the information transmitted or received by the UE or relay.

FIG. 1 is a diagram illustrating physical channels used in a 3GPP LTE system and a general signal transmission method using the physical channels.

A terminal performs an initial cell search operation such as synchronization with a BS when the terminal is powered on or enters a new cell (S101). To this end, the terminal may receive a primary synchronization channel (P-SCH) and a secondary synchronization channel (S-SCH) from the BS so as to be synchronized with the BS, and acquire information such as cell ID. Then, the terminal may receive a physical broadcast channel from the BS so as to acquire broadcast information in the cell. In the initial cell search, the terminal may receive a downlink reference signal (DL RS) so as to check a DL channel state.

The terminal which completes the initial cell search may acquire more detailed system information by receiving a physical downlink control channel (PDCCH) and a physical downlink shared channel (PDSCH) according to information contained in the PDCCH (S102).

Meanwhile, if the terminal initially accesses the BS or has no radio resource for signal transmission, the terminal may perform a random access procedure for the BS (S103 to S106). To this end, the terminal may transmit a specific sequence as a preamble through a physical random access channel (PRACH) (S103 and S105) and receive a response message to the preamble through the PDCCH and corresponding PDSCH (S104 and S106). In the case of competition-based RACH, a contention resolution procedure may be additionally performed.

The terminal which has performed the procedure described above may receive a PDCCH/PDSCH (S107) and transmit a physical uplink shared channel (PUSCH)/physical uplink control channel (PUCCH) (S108) as a normal UL/DL signal transmission procedure. The information transmitted from the terminal to the BS through an UL or transmitted from the BS to the terminal includes a DL/UL acknowledgement (ACK)/non-acknowledgement (NACK) signal, a channel quality indicator (CQI), a precoding matrix index (PMI), a rank indicator (RI), etc.

Figure 2:
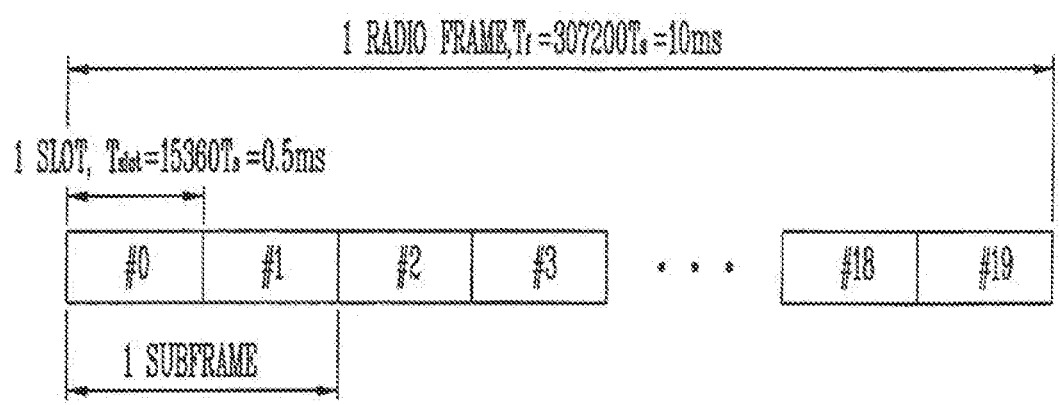
FIG. 2 is a diagram illustrating the structure of a radio frame used in the 3GPP LTE system.

FIG. 2 is a diagram illustrating the structure of a radio frame used in the 3GPP LTE system.

Referring to FIG. 2, one radio frame has a length of 10 ms (327200 Ts) and consists of ten subframes having an equal size. Each of the subframes has a length of 1 ms and is composed of two slots. Each of the slots has a length of 0.5 ms (15360 $T_s$). Here, $T_s$ denotes a sampling time and is represented by $T_s=1/(15\ kHz\times2048)=3.1552\times10^{-8}$ (about 33 ns). The slot includes a plurality of orthogonal frequency division multiplexing (OFDM) or single carrier-frequency division multiple access (SC-FDMA) symbols in the time domain and includes a plurality of resource blocks in the frequency domain.

In the LTE system, one resource block (RB) includes 12 subcarriers×7(6) OFDM or SC-FDMA symbols. A transmission time interval (TTI) that is a unit time for which data is transmitted may be determined in a unit of one or more subframes. The aforementioned structure of the radio frame is merely exemplary, and the number of subframes included in the radio frame, the number of slots included in each of the subframes and the number of OFDM or SC-FDMA symbols included in each of the slots may be variously changed.

FIG. 3 is a diagram illustrating the structures of DL and UL subframes used in the 3GPP LTE system.

Referring to 3 (a), one DL subframe includes two slots in the time domain. A maximum of three OFDM symbols prior to a first slot in the DL subframe become a control region in which control channels are allocated, and the other OFDM symbols become a data region in which PDSCHs are allocated.

The DL control channels used in the 3GPP LTE system, etc. includes a physical control format indicator channel (PCFICH), a physical downlink control channel (PDCCH), a physical hybrid-ARQ indicator channel (PHICH), etc. The PCFICH transmitted in a first OFDM symbol of the subframe carries information on the number of OFDM symbols (i.e., the size of the control region) used in the transmission of control channels in the subframe. The control information transmitted through the PDCCH is referred to as downlink control information (DCI). The DCI indicates UL resource allocation information, DL resource allocation information, UL transmission power control commands for arbitrary terminal groups, etc. The PICH carries an ACK/NACK signal for a hybrid automatic repeat request (HARQ). That is, the ACK/NACK signal for UL data transmitted by the terminal is transmitted on the PHICH.

Hereinafter, the PDCCH that is a DL physical channel will be described in brief.

The PDCCH will be described in detail later with reference to FIGS. 5 to 8.

A BS may transmit, through the PDCCH, resource allocation and transmission format of PDSCH (this is also referred to as DL grant), resource allocation information of PUSCH (this is also referred to as UL grant), an arbitrary terminal, a set of power control commands for individual terminals in a group, activation of a voice over Internet protocol (VoIP), etc. A plurality of PDCCHs may be transmitted in the control region, and a terminal may monitor the plurality of PDCCHs. The PDCCH is configured as an aggregation of one or some continuous control charge elements (CCEs).

The PDCCH configured as the aggregation of one or some continuous CCEs may be subjected to subblock interleaving and then transmitted through the control region. The CCE is a logical allocation unit used to provide a code rate according to the status of a radio channel to the PDCCH. The CCE corresponds to a plurality of resource element groups. The format of the PDCCH and the number of available bits of the PDCCH are determined according to the correlation between the number of CCEs and the code rate provided by the CCEs.

The control information transmitted through the PDCCH is referred to as DCI. The following Table 1 shows DCI according to DCI formats.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |

TABLE 1-continued

| DCI Format | Description |
| --- | --- |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 indicates UL resource allocation information, and DCI formats 1 to 2 indicate DL resource allocation information. DCI formats 3 and 3A indicate UL transmit power control (TPC) commands for arbitrary terminal groups.

A scheme of mapping resources for a BS to transmit PDCCH in the LTE system will be described in brief.

In general, a BS may transmit scheduling allocation information and other control information through PDCCH. A physical control channel may be transmitted to one aggregation or a plurality of continuous CCEs. One CCE includes 9 resource element groups (REGs).

The number of REGs unallocated to a physical control format indicator channel (PCFICH) or physical hybrid automatic repeat request indicator channel (PHICH) is $N_{REG}$. The CCE that can be used in the system is 0 to $N_{CCE-1}$ (here, $N_{CCE} = \lfloor N_{REG}/9 \rfloor$). The PDCCH supports multiple formats as shown in the following Table 2. One PDCCH configured with n continuous CCEs starts from CCE performing i mode n=0 (here, i is a CCE number). The multiple PDCCHs may be transmitted in one subframe.

TABLE 2

| PDCCH format | Number of CCEs | Number of resource element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 2, a BS may determine a PDCCH format according to how many regions the BS is to transmit control information, etc. A terminal may reduce overhead by reading control information, etc. in the unit of CCE. Similarly, a relay may also read control information, etc. in the unit of R-CCE. In the LTE-A system, resource elements (REs) may be mapped in the unit of relay-control channel element (R-CCE) so as to transmit R-PDCCH for an arbitrary relay.

Referring to FIG. 3 (b), the UL subframe may be divided into a control region and a data region in the frequency domain. The control region is allocated to PUCCH carrying UL control information. The data region is allocated to PUSCH carrying user data. To maintain properties of a single carrier, one terminal does not transmit the PUCCH and PUSCH at the same time. The PUCCH for one terminal is allocated to an RB pair in one subframe. RBs belonging to the RB pair occupy different subcarriers in two slots, respectively.

The RB pair allocated to the PUCCH is frequency-hopped at a slot boundary.

Figure 4:
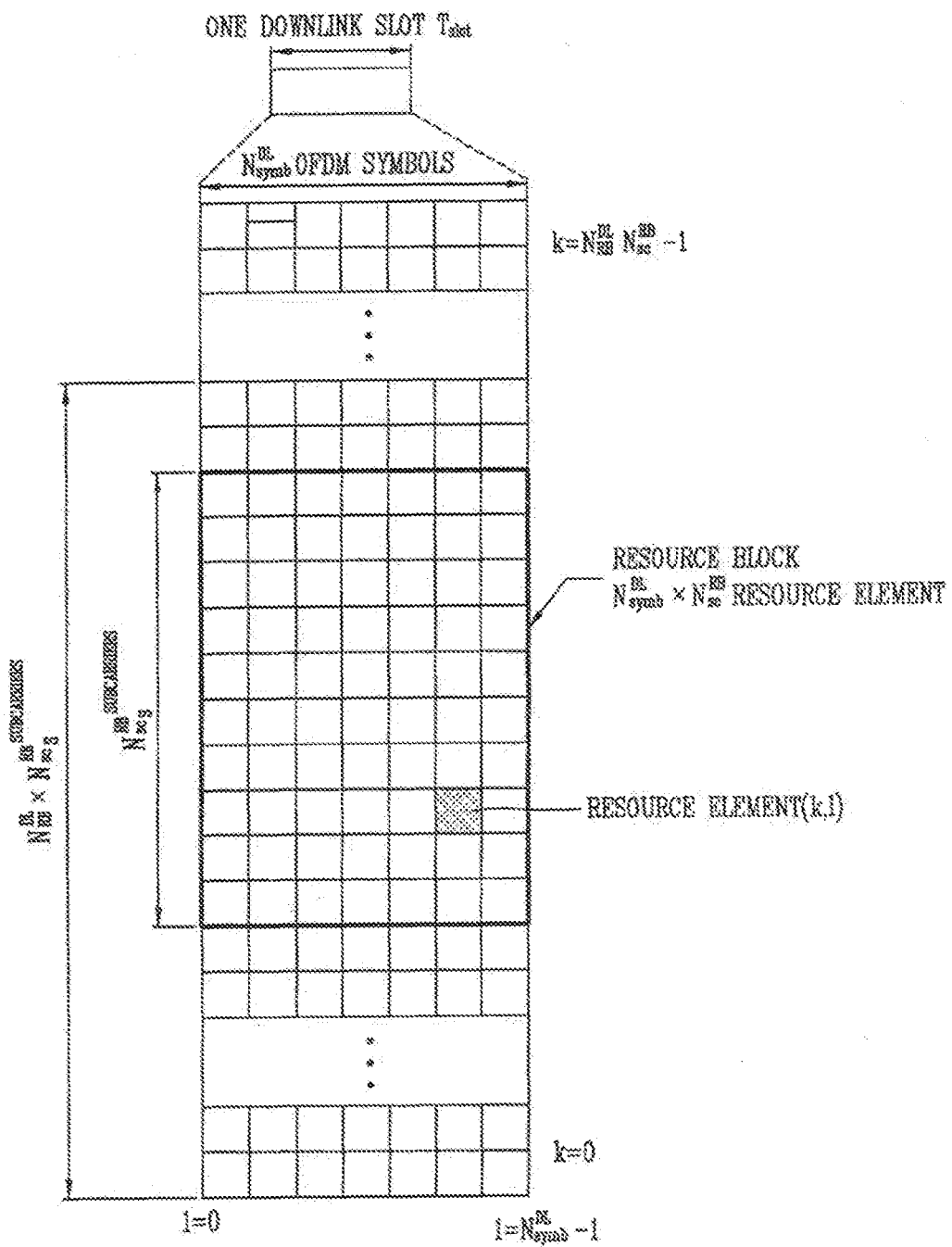
FIG. 4 is a diagram illustrating a time-frequency resource grid structure of a downlink used in the 3GPP LTE system.

FIG. 4 is a diagram illustrating a time-frequency resource grid structure of a downlink used in the 3GPP LTE system.

A DL signal transmitted in each of the slots uses a resource grid structure configured with $N_{RB}^{DL} \times N_{SC}^{RB}$ subcarriers and $N_{symb}^{DL}$ OFDM symbols. Here, $N_{RB}^{DL}$ denotes the number of RBs in a DL, $N_{SC}^{RB}$ denotes the number of subcarriers constituting one RB, and $N_{symb}^{DL}$ denotes the number of OFDM symbols in one DL slot. The size of $N_{RB}^{DL}$ is changed depending on the transmission bandwidth of the DL configured in a cell, and must satisfy $N_{RB}^{min,DL} \leq N_{RB}^{DL} \leq N_{RB}^{max,DL}$. Here, $N_{RB}^{min,DL}$ denotes the smallest DL bandwidth supported in the radio communication system, and $N_{RB}^{max,DL}$ denotes the greatest DL bandwidth supported in the radio communication system. Although $N_{RB}^{min,DL} = 6$ and $N_{RB}^{max,DL} = 110$, the present disclosure is not limited thereto. The number of OFDM symbols included in one slot may be changed depending on the length of a cyclic prefix (CP) and the interval between subcarriers. In the case of multi-antenna transmission, one resource grid may be defined per antenna port.

Each element in the resource grid for each antenna port is called as a resource element (RE), and is uniquely identified by an index pair (k, l).

Here, k denotes an index in the frequency domain, and l denotes an index in the time domain. The k has the value of any one of $0, \ldots, N_{RB}^{DL} N_{SC}^{RB} - 1$, and the l has the value of any one of $0, \ldots, N_{symb}^{DL} - 1$.

The resource block shown in FIG. 4 is used to describe the mapping relationship between a physical channel and REs. The RB may be divided into a physical resource block (PRB) and a virtual resource block (VRB). One PRB is defined by continuous $N_{symb}^{DL}$ OFDM symbols in the time domain and $N_{SC}^{RB}$ continuous subcarriers in the frequency domain. Here, the $N_{symb}^{DL}$ and $N_{SC}^{RB}$ may be predetermined values. For example, the $N_{RB}^{DL}$ and may be given as shown in the following Table 3. Therefore, the one PRB is configured with $N_{symb}^{DL} \times N_{SC}^{RB}$ REs. Although the one PRB may be correspond to one slot in the time domain and correspond to 180 kHz in the frequency domain, the present disclosure is not limited thereto.

TABLE 3

| Configuration | | $N_{SG}^{RB}$ | $N_{symb}^{DL}$ |
| --- | --- | --- | --- |
| Normal cyclic prefix | Δf = 15 kHz | 12 | 7 |
| Extended cyclic prefix | Δf = 15 kHz | | 6 |
| | Δf = 7.5 kHz | 24 | 3 |

The PRB has a value of 0 to $N_{RB}^{DL} - 1$ in the frequency domain. The relationship between a PRB number nPRB in the frequency domain and the REs (k, l) in one slot satisfies $$n_{PRB} = \left\lfloor \frac{k}{N_{SC}^{RB}} \right\rfloor.$$

The size of the VRB is identical to that of the PRB. The VRB may be divided into a localized VRB (LVRB) and a distributed VRB (DVRB). For each type of VRB, a pair of VRBs existing in two slots within one subframe is allocated together with a number $n_{VRB}$.

The VRB and the PRB have the same size. Two types of VRBs are defined: a first type of VRB is the LVRB and a second type of VRB is the DVRB. For each type of VRB, a pair of VRBs has a single VRB index (hereinafter, referred to as a VBR number), and is allocated through two slots within one subframe. In other words, any one of 0 to $N_{RB}^{DL}-1$ indices is allocated to each of the $N_{RB}^{DL}$ VRBs belonging to a first slot of the two slots constituting the one subframe, and any one of 0 to indices is also allocated to each of the $N_{RB}^{DL}$ VRBs belonging to a second slot of the two slots.

As described above, the structure of the radio frame, the DL and UL subframes, the time-frequency resource grid structure of the DL, etc., which are described in FIGS. 2 to 4, may also be applied between the BS and the relay.

Hereinafter, a procedure in which the BS performs downlink transmission of PDCCH to the terminal in the LTE system will be described.

Figure 5:
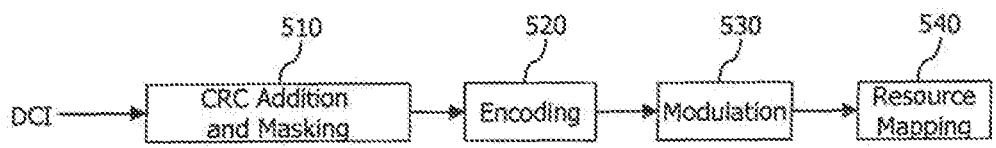
FIG. 5 is a block diagram illustrating the configuration of a physical downlink control channel (PDCCH)

FIG. 5 is a block diagram illustrating the configuration of PDCCH.

After the BS determines a PDCCH format according to the DCI to be downlink transmitted to the UE, the BS adds a cyclic redundancy check (CRC) to the DCI, and masks a unique identifier (this is referred to as a radio network temporary identifier (RNTI)) to the CRC according to the owner or usage of the PDCCH (510).

If the PDCCH is a PDCCH for a specific UE, a unique identifier of the UE, e.g., a cell-RNTI (C-RNTI) may be masked to the CRC. Alternatively, if the PDCCH is a PDCCH for a paging message, a paging indicator identifier, e.g., a paging-RNTI (P-RNTI) may be masked to the CRC. If the PDCCH is a PDCCH for system information, a system information identifier, e.g., a system information-RNTI (SI-RNTI) may be masked to the CRC. A random access-RNTI (RA-RNTI) may be masked to the CRC so as to indicate a random access response that is a response to the transmission of an access preamble of the UE. A transmit power control-RNTI (TPC-RNTI) may be masked to the CRC so as to indicate a TPC command to a plurality of UEs.

If the C-RNTI is used, the PDCCH carries control information for a corresponding specific UE (this is referred to as UE-specific control information). If another RNTI is used, the PDCCH carries common control information received to all or a plurality of UEs in the cell.

The CRC generates coded data by encoding the DCI (520). The encoding includes channel encoding and rate matching.

The coded data is modulated to generate modulation symbols (530).

The modulation symbols are mapped to PREs (540). Each of the modulation symbols is mapped to the RE.

Figure 6:
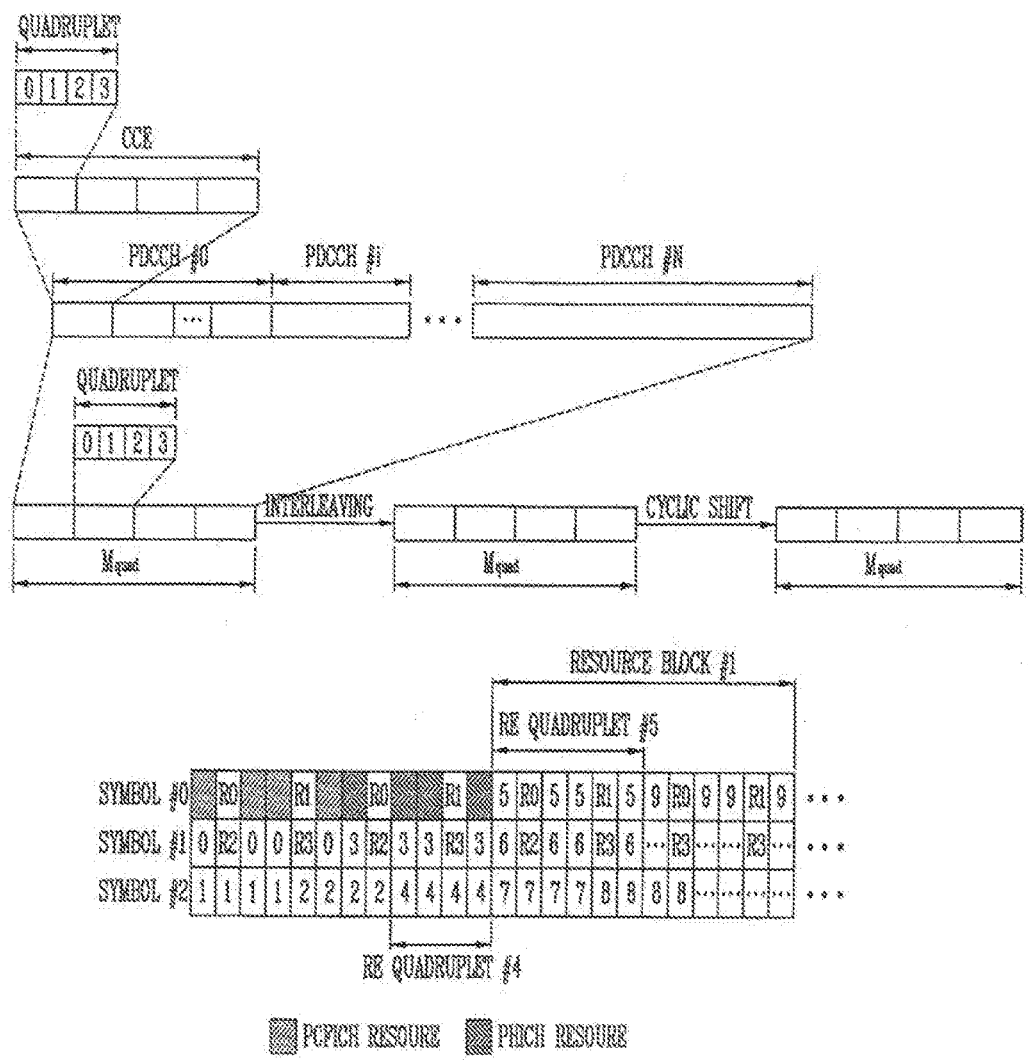
FIG. 6 is a diagram illustrating an example of resource mapping of the PDCCH.

FIG. 6 is a diagram illustrating an example of resource mapping of the PDCCH.

Referring to FIG. 6, R0 denotes a reference signal of a first antenna, R1 denotes a reference signal of a second antenna, R2 denotes a reference signal of a third antenna, and R3 denotes a reference signal of a fourth antenna.

The control region within one subframe includes a plurality of CCEs. The CCE is a logical allocation unit used to provide a code rate according to the status of a radio channel to the PDCCH, and corresponds to a plurality of REGs. The REG includes a plurality of REs. The format of the PDCCH and the number of available bits of the PDCCH are determined according to the correlation between the number of CCEs and the code rate provided by the CCEs.

One REG (designated by a quadruplet in this figure) includes four REs, and one CCE includes nine REGs. To constitute one PDCCH, {1, 2, 4, 8} CCEs may be used, and each of the {1, 2, 4, 8} CCEs is called as a CCE aggregation level.

The control channel configured with one or more CCEs performs interleaving in the unit of REG, and is mapped to a physical resource after the cyclic shift based on a cell ID is performed.

Figure 7:
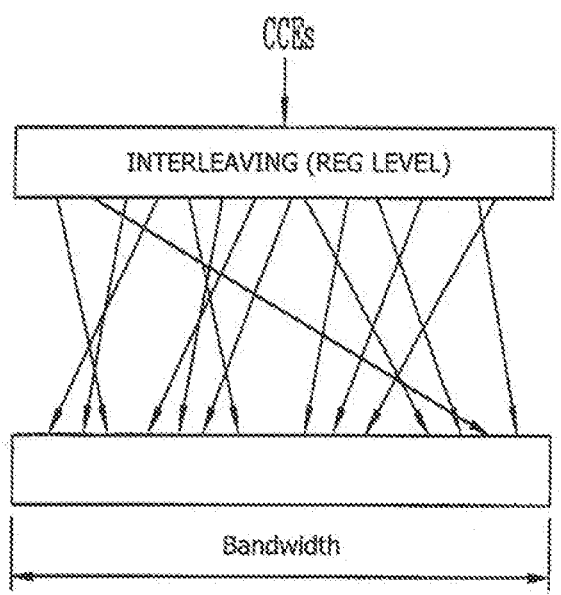
FIG. 7 is a diagram illustrating control channel element (CCE) interleaving in a system band.

FIG. 7 illustrates an example of interleaving CCEs in a system band.

Referring to FIG. 7, a plurality of logically consecutive CCEs are input as an interleaver. The interleaver functions to mix the input CCEs in the unit of REG.

Thus, frequency/time resources constituting one CCE are physically distributed in the entire frequency/time domain within the control region of the subframe. Although the control channel is configured in the unit of CCE, the interleaving is performed in the unit of REG, so that it is possible to maximize frequency diversity and interference randomization.

Figure 8:
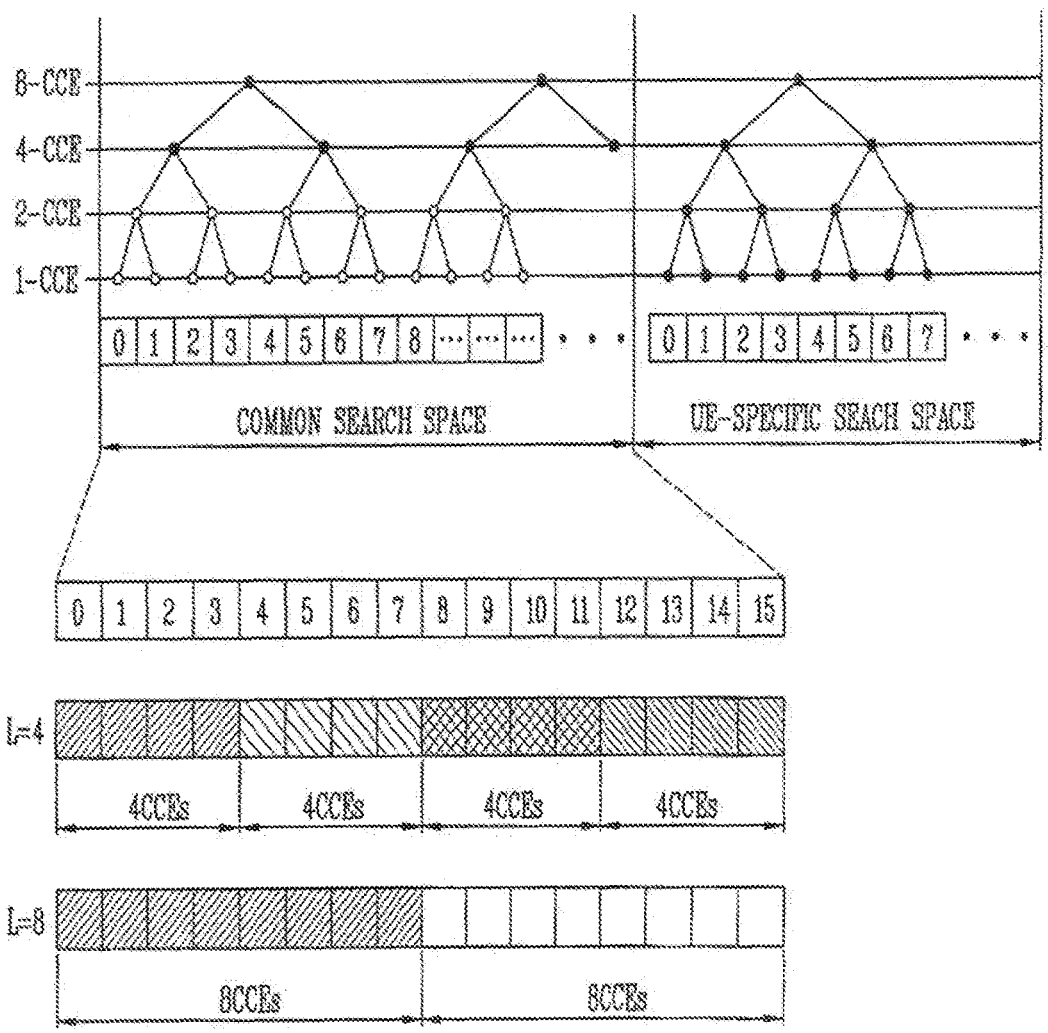
FIG. 8 is an exemplary diagram illustrating monitoring of the PDCCH.

FIG. 8 is an exemplary diagram illustrating monitoring of the PDCCH.

Blind decoding for PDCCH detection is used in the 3GPP LTE system. The blind decoding is a scheme of demasking a desired identifier to the CRC of a received PDCCH (this is referred to as a PDCCH candidate) and identifying whether or not the corresponding PDCCH is its own control channel by checking a CRC error. The terminal does not recognize at which position in the control region its own PDCCH is transmitted and with which CCE aggregation level or DCI format its own PDCCH is transmitted.

A plurality of PDCCHs may be transmitted within one subframe. The terminal monitors a plurality of PDCCHs at every subframe. Here, the monitoring refers to decoding of the PDCCH tried according to the format of the PDCCH monitored by the terminal.

In the 3GPP LTE system, a search space is used to reduce the load caused by the blind decoding. The search space may be called as a monitoring set of CCEs for PDCCHs. The terminal monitors PDCCHs in the corresponding search space.

The search space is divided into a common search space and a UE-specific search space. The common search space is a space for searching for PDCCHs having common control information. The common search space consists of 16 CCEs having CCE indices of 0 to 15, and support PDCCHs having CCE aggregation levels of {4, 8}. However, PDCCHs (DCI formats 0 and 1A) carrying UE-specific information may also be transmitted in the common search space. The UE-specific search space supports PDCCHs having CCE aggregation levels of {1, 2, 4, 8}.

The following Table 4 shows the number of PDCCH candidates monitored by the terminal.

TABLE 4

| Search Space Type | Aggregation Level L | Size (in CCEs) | Number of PDCCH candidates | DCI formats |
|---|---|---|---|---|
| UE-specific | 1 | 6 | 6 | 0, 1, 1A, 1B, 1D, 2, 2A |
|  | 2 | 12 | 6 |  |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

The size of the search space is determined by Table 4, and starts points of the common search space and the UE-specific search space are defined different from each other in the search space. The start point of the common search space may be changed for each subframe depending on a terminal identifier (e.g., C-RNTI), a CCE aggregation level and/or a slot number in the radio frame. When the start point of the UE-specific search space exists within the common search space, the UE-specific search space and the common search space may be overlapped with each other.

A search space $S^{(L)}_k$ at the aggregation level $L \in \{1,2,3,4\}$ is defined as a set of PDCCH candidates. The CCE corresponding to a PDCCH candidate m of the search space $S^{(L)}_k$ is given as follows.

$$L \cdot \{(Y_k+m) \bmod \lfloor N_{CCE,k}/L \rfloor \}+i \quad \text{Expression 1}$$

Here, i=0, 1, . . . , L−1 and m=0, . . . , $M^{(L)}$−1, $N_{CCE,k}$ denote the total number of CCEs that can be used in the transmission of PDCCH in a control region of a subframe k. The control region includes an aggregation of CCEs numbered by 0 to $N_{CCE,k}$−1. $M^{(L)}$ denotes the number of PDCCH candidates at the CCE aggregation level L in a given search space. In the common search space, $Y_k$ is set to 0 with respect to two aggregation levels i.e., L=4 and L=8. In the UE-specific search space, Yk is defined as follows.

$$Y_k = (A \cdot Y_{k-1}) \bmod D \quad \text{Expression 2}$$

Here, $Y_{-1}=n_{RNTI} \neq 0$, A=39827, D=65537, k=floor($n_s/2$), and $n_s$ denotes a slot number in the radio frame.

When the terminal monitors PDCCHs using the C-RNTI, the DCI format and search space to be monitored are determined according to the transmission mode of PDSCH.

The following Table 5 shows an example of PDCCH monitoring in which C-RNTI is set.

TABLE 5

| Transmission Mode | DCI Format | Search Space | Transmission Mode of PDSCH according to PDCCH |
|---|---|---|---|
| Mode 1 | DCI format 1A | Common & UE-specific | Single antenna part, Port 0 |
|  | DCI format 1 | UE-specific | Single antenna part, port 0 |
| Mode 2 | DCI format 1A | Common & UE-specific | Transmit diversity |
|  | DCI format 1 | UE-specific | Transmit diversity |
| Mode 3 | DCI format 1A | Common & UE-specific | Transmit diversity |
|  | DCI format 2A | UE-specific | Cyclic delay diversity (CDD) or transmit diversity |
| Mode 4 | DCI format 1A | Common & UE-specific | Transmit diversity |
|  | DCI format 2 | UE-specific | Closed-loop spatial multiplexing |
| Mode 5 | DCI format 1A | Common & UE-specific | Transmit diversity |
|  | DCI format 1D | UE-specific | Multi-user multiple input multiple output (MU-MIMO) |
| Mode 6 | DCI format 1A | Common & UE-specific | Transmit diversity |
|  | DCI format 1B | UE-specific | Closed-loop spatial multiplexing |
| Mode 7 | DCI format 1A | Common & UE-specific | If number of PBCH transmit ports is 1, single antenna port, and otherwise, transmit diversity |
|  | DCI format 1 | UE-specific | Single antenna part, Port 5 |
| Mode 8 | DCI format 1A | Common & UE-specific | If number of PBCH transmit ports is 1, single antenna port, and otherwise, transmit diversity |
|  | DCI format 2B | UE-specific | Dual layer transmission (port 7 or 8), or single antenna port, port 7 or 8 |

When the terminal monitors PDCCH using SPS C-RNTI, the DCI format and search space to be monitored are determined according to the transmission mode.

The following Table 6 shows an example of PDCCH monitoring in which the SPS C-RNTI is configured.

TABLE 6

PDCCH and PDSCH configured by SPS C-RNTI

| Transmission Mode | DCI Format | Search Space | Transmission Scheme of PDSCH Corresponding to PDCCH |
|---|---|---|---|
| Mode 1 | DCI format 1A | Common and UE-specific by C-RNTI | Single-antenna port, port 0 (see subclause 7.1.1) |
|  | DCI format 1 | UE-specific by C-RNTI | Single-antenna port, port 0 (see subclause 7.1.1) |
| Mode 2 | DCI format 1A | Common and UE-specific by C-RNTI | Transmit diversity (see subclause 7.1.2) |
|  | DCI format 1 | UE-specific by C-RNTI | Transmit diversity (see subclause 7.1.2) |
| Mode 3 | DCI format 1A | Common and UE-specific by C-RNTI | Transmit diversity (see subclause 7.1.2) |
|  | DCI format 2A | UE-specific by C-RNTI | Transmit diversity (see subclause 7.1.2) |
| Mode 4 | DCI format 1A | Common and UE-specific by C-RNTI | Transmit diversity (see subclause 7.1.2) |
|  | DCI format 2 | UE-specific by C-RNTI | Transmit diversity (see subclause 7.1.2) |
| Mode 5 | DCI format 1A | Common and UE-specific by C-RNTI | Transmit diversity (see subclause 7.1.2) |
| Mode 6 | DCI format 1A | Common and UE-specific by C-RNTI | Transmit diversity (see subclause 7.1.2) |
| Mode 7 | DCI format 1A | Common and UE-specific by C-RNTI | Single-antenna port, port 5 |
|  | DCI format 1 | UE-specific by C-RNTI | Single-antenna port, port 5 |

The following Table 7 shows an example of the PDCCH monitoring in which the SPS C-RNTI is configured.

TABLE 7

PDCCH configured by SPS C-RNTI

| DCI Format | Search Space |
|---|---|
| DCI format 0 | Command and UE-specific by C-RNTI |

Hereinafter, a multiple carrier system will be described.

Although the 3GPP LTE system supports a case in which the bandwidths of DL and UL are set different from each other, this sets forth one component carrier (CC).

This means that only the case in which the bandwidths of the DL and UL are identical to or different from each other is supported under the situation in which one CC is defined with respect to each of the DL and UL. For example, the 3GPP LTE system supports a maximum of 20 MHz. Although the bandwidths of the DL and UL are different from each other, the 3GPP LTE system supports one CC with respect to each of the DL and UL.

Spectrum aggregation (bandwidth aggregation or carrier aggregation) is to support a plurality of CCs. The spectrum aggregation is introduced to support an increased throughput, to prevent an increase in cost due to the introduction of a RF element and to ensure compatibility with existing systems. For example, if five CCs are allocated as the granularity of a carrier unit having a bandwidth of 20 MHz, the 3GPP LTE system can support a maximum bandwidth of 100 MHz.

The spectrum aggregation may be divided into contiguous spectrum aggregation performed between continuous carriers in the frequency domain and non-contiguous spectrum aggregation performed between discrete carriers. The number of CCs aggregated between the DL and UL may be set different from each other. The case in which the number of DL CCs is identical to that of UL CCs is referred to as symmetric aggregation, and the case in which the number of DL CCs is different from that of UL CCs is referred to as asymmetric aggregation.

The DL and UL CCs may be called together as a 'cell.' That is, the 'cell' may be used as a concept of a pair of DL CC and UL CC. Here, the 'cell' used herein must be distinguished from a 'cell' as a region covered by a generally used BS.

The sizes (i.e., bandwidth) of the CCs may be different from each other. For example, when five CCs are used for the configuration of a cell having a band of 70 MHz, the cell may be configured as 5 MHz carrier (CC #0)+20 MHz carrier (CC #1)+20 MHz carrier (CC #2)+20 MHz carrier (CC #3)+5 MHz carrier (CC #4).

Figure 9:
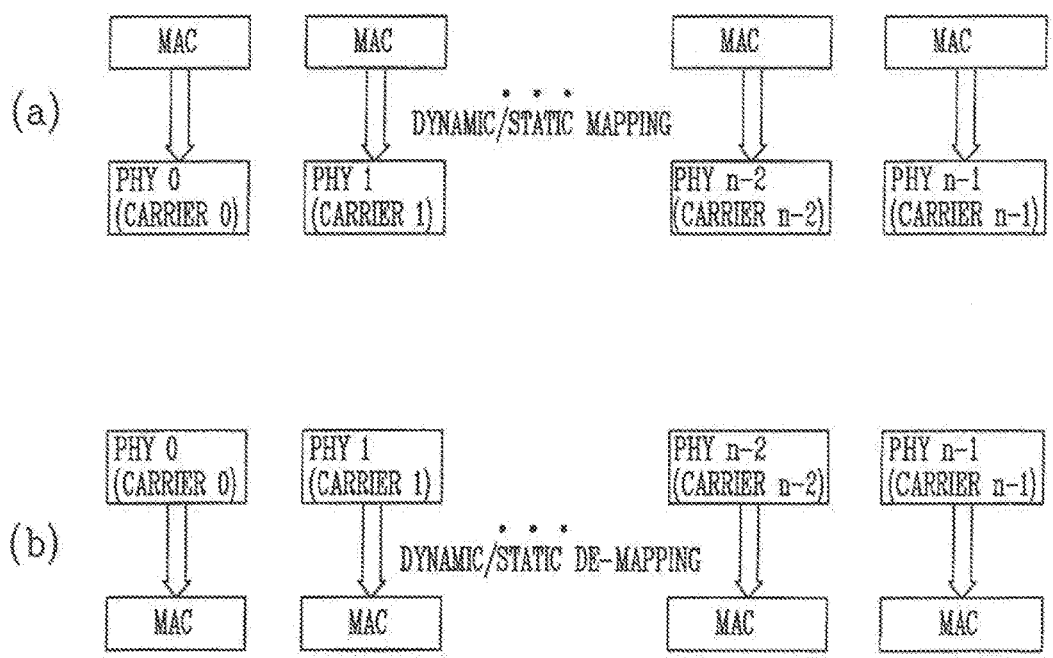
FIG. 9 (a) is a diagram illustrating a concept in which a plurality of media access controls (MACs) manage multiple carriers in a base station, and FIG. 9 (b) is a diagram illustrating a concept in which a plurality of MACs manage multiple carriers in a user equipment (UE)
Figure 10:
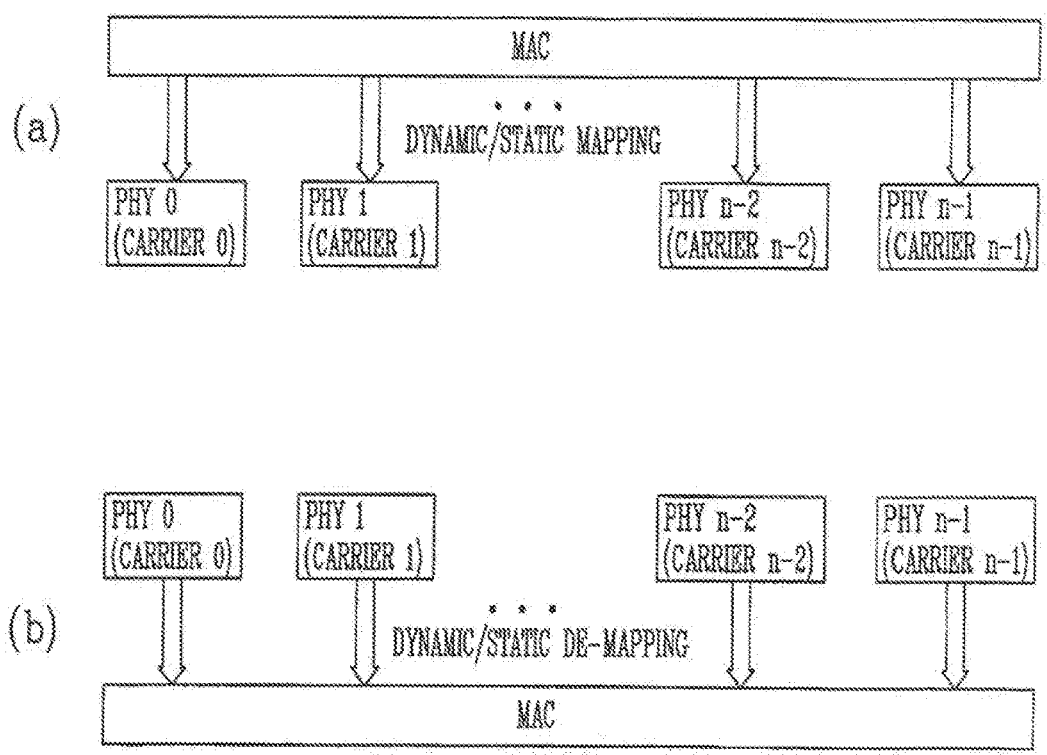
FIG. 10 (a) is a diagram illustrating a concept in which one MAC manages multiple carriers in a base station, and FIG. 10 (b) is a diagram illustrating a concept in which one MAC manages multiple carriers in the UE.

The configuration of a physical layer (PHY) and a layer 2 (MAC) for transmission in a plurality of UL or DL carrier bands allocated to an arbitrary cell or terminal may be shown in FIGS. 9 and 10.

FIG. 9 (a) is a diagram illustrating a concept in which a plurality of media access controls (MACs) manage multiple carriers in a base station, and FIG. 9 (b) is a diagram illustrating a concept in which a plurality of MACs manage multiple carriers in a terminal.

As shown in FIGS. 9 (a) and (b), MACs may control the carriers one by one, respectively. In a system supporting a plurality of carriers, each of the carriers may be used contiguous or non-contiguous. The carrier may be applied regardless of the UL/DL. A time division duplex (TDD) system is configured to operate N carriers including DL transmission and UL transmission within each of the carriers, and a frequency division duplex (FDD) is configured to use a plurality of carriers in each of the UL and DL. The FDD system may support asymmetric carrier combination in which the numbers and/or bandwidths of carriers combined in the UL and DL may support are different.

FIG. 10 (a) is a diagram illustrating a concept in which one MAC manages multiple carriers in a BS, and FIG. 10 (b) is a diagram illustrating a concept in which one MAC manages multiple carriers in the terminal.

Referring to FIGS. 10 (a) and (b), one MAC performs transmission/reception by managing and operating one or more frequency carriers. Since it is unnecessary that the frequency carriers managed in the one MAC are contiguous to each other, it is further flexible in terms of the management of resources. In FIGS. 10 (a) and (b), one PHY means one component carrier for convenience of illustration. Here, the one PHY does not necessarily means an independent RF device. Although the independent RF device generally means one PHY, the present disclosure is not limited thereto, and one RF device may include several PHYs.

A series of PDCCHs transmitting control information of L1/L2 control signaling, generated from a packet scheduler of the MAC layer for supporting the configuration in the FIGS. 10 (a) and (b), may be transmitted by being mapped to physical resources in an individual component carrier.

Particularly, the PDCCH for channel allocation related to unique PDSCH or PUSCH transmission of an individual terminal or control information related to grant may be generated as PDCCH encoded for each component carrier transmitted through a corresponding physical sharing channel. The generated PDCCH is called as a separate coded PDCCH. In another manner, control information for physical sharing channel transmission of several carrier components may be configured as one PDCCH to be transmitted. The PDCCH is called as a joint coded PDCCH.

To support the DL or UL carrier combination, the BS may configure connection so that the PDCCH and/or PDSCH for performing control information and data transmission suitable for a unique situation fore each specific terminal or relay is transmitted, or may allocate component carriers that become targets of measurement and/or reporting as a preliminary procedure of performing connection configuration for the transmission of the PDCCH and/or PDSCH. The allocation is called as component carrier allocation according to an arbitrary purpose.

In case where component carrier allocation information is controlled in L3 radio resource management (RRM), the BS may transmit the PDCCHs through unique radio resource control (RRC) signaling (UE-specific or relay-specific RRC signaling) of a series of terminals or relays according to control dynamic characteristics, or may transmit the PDCCHs through L1/L2 signals or a series of dedicated physical channels for the transmission of only the control information.

Figure 11:
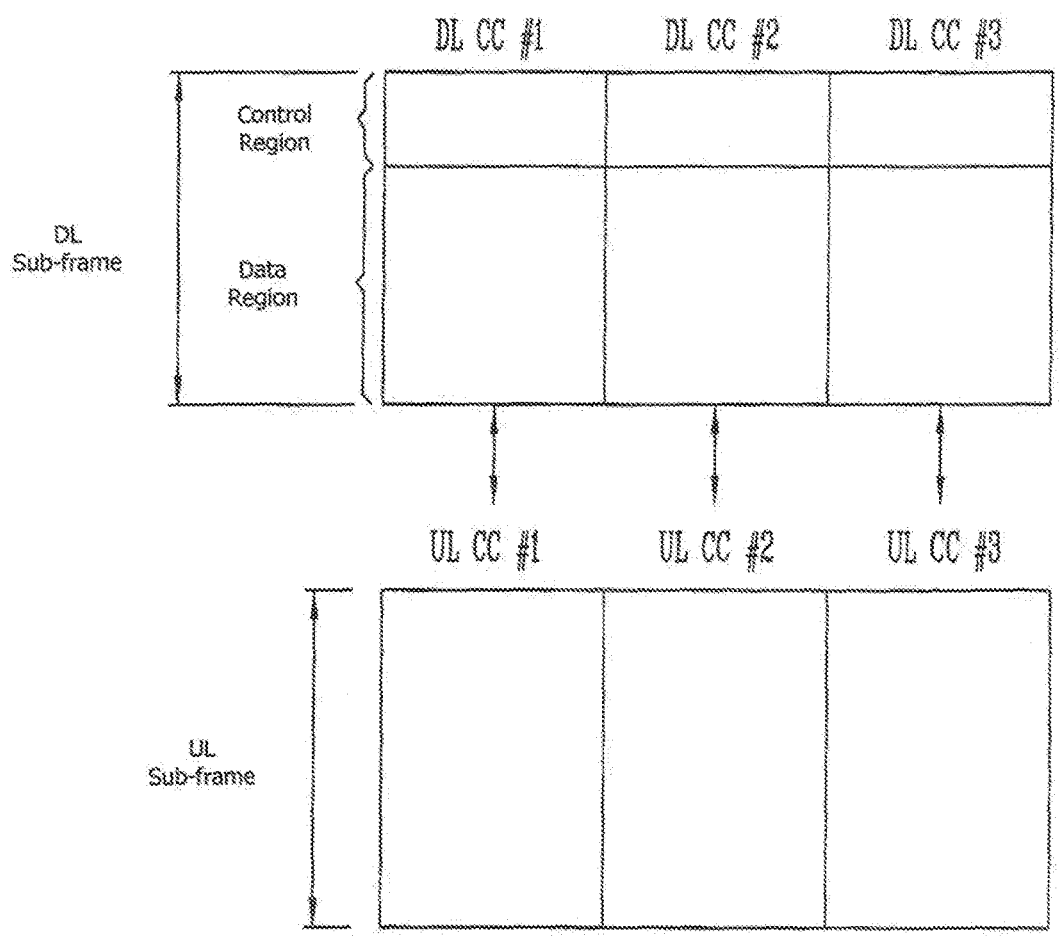
FIG. 11 is a diagram illustrating an example of multiple carriers.

FIG. 11 is a diagram illustrating an example of the multiple carriers.

Although the number of each of the DL CCs and UL CCs is three, the present disclosure is not limited to the number of DL CCs and UL CCs. PDCCH and PDSCH are independently transmitted in each of the DL CCs, and PUCCH and PUSCH are independently transmitted in each of the DL CCs.

Hereinafter, the multiple carrier system, as described above, refers to a system that supports multiple carriers based on the spectrum aggregation.

The contiguous spectrum aggregation and/or non-contiguous spectrum aggregation may be used in the multiple carrier system, and any one of the symmetric aggregation and asymmetric aggregation may be used in the multiple carrier system.

In the multiple carrier system, the linkage between the DL CC and UL CC may be defined. The linkage may be configured through EARFCN information contained in DL system information. The linkage is configured using a fixed DL/UL Tx/Rx separation relationship. The linkage refers to a mapping relationship between the DL CC through which PDCCH carrying UL grant is transmitted and the UL CC using the UL grant.

Alternatively, the linkage may be a mapping relationship between the DL CC (or UL CC) through which data for HARQ is transmitted and the UL CC (or DL CC) through which HARQ ACK/NACK signal is transmitted. The BS may transmit linkage information to the terminal as a high-level layer message such as an RRC message or a portion of system information. The linkage between the DL CC and UL CC may be fixed, but may be changed into the linkage between cells/terminals.

The separate-coded PDCCH means that one PDCCH can carry control information such as resource allocation for PDSCH/PUSCH with respect to one carrier. That is, the PDCCH and PDSCH correspond to each other, and the PDCCH and PUSCH corresponds to each other.

The joint-coded PDCCH means that one PDCCH that can carry control information such as resource allocation for PDSCH/PUSCH of a plurality of CCs. The one PDCCH may be transmitted through one CC or may be transmitted through a plurality of CCs.

Hereinafter, although an example of division coding based on PDSCH-PDSCH that is a DL channel for convenience of illustration, this may also be applied to the relationship between PDCCH and PUSCH.

In the multiple carrier system, the CC scheduling may be implemented using two methods.

In a first method, a PDCCH-PDSCH pair is transmitted through one CC. The CC is referred to as a self-scheduling CC. The self-scheduling CC means that the UL CC through which the PUSCH is transmitted becomes a CC linked to the DL CC through which the corresponding PDCCH is transmitted.

That is, the PDCCH allocates PDSCH resources on the same CC or allocates PUSCH resources on the linked UL CC.

In a second method, the DL CC through which the PDSCH is transmitted or UL CC through which the PUSCH is transmitted is determined regardless of the DL CC through which the PDCCH is transmitted. That is, the PDCCH and PDSCH are transmitted through different DL CCs from each other, or the PUSCH is transmitted through the UL CC not linked with the DL CC through which the PDCCH is transmitted. This is referred to as cross-carrier scheduling.

The CC through which the PDCCH is transmitted may be called as a PDCCH carrier, monitoring carrier or scheduling carrier. The CC through which the PDSCH/PUSCH is transmitted may be called as a PDSCH/PUSCH carrier or scheduled carrier.

The cross-carrier scheduling may be activated/non-activated for each terminal, and the terminal activated by the cross-carrier scheduling may receive DCI containing CIF. The terminal can recognize on which scheduled CC the PDCCH received from the CIF contained in the DCI is control information.

The DL-UL linkage predetermined by the cross-carrier scheduling may be overridden. That is, the cross-carrier scheduling is not performed on the linked CC but performed on another CC, regardless of the DL-UL linkage.

Figure 12:
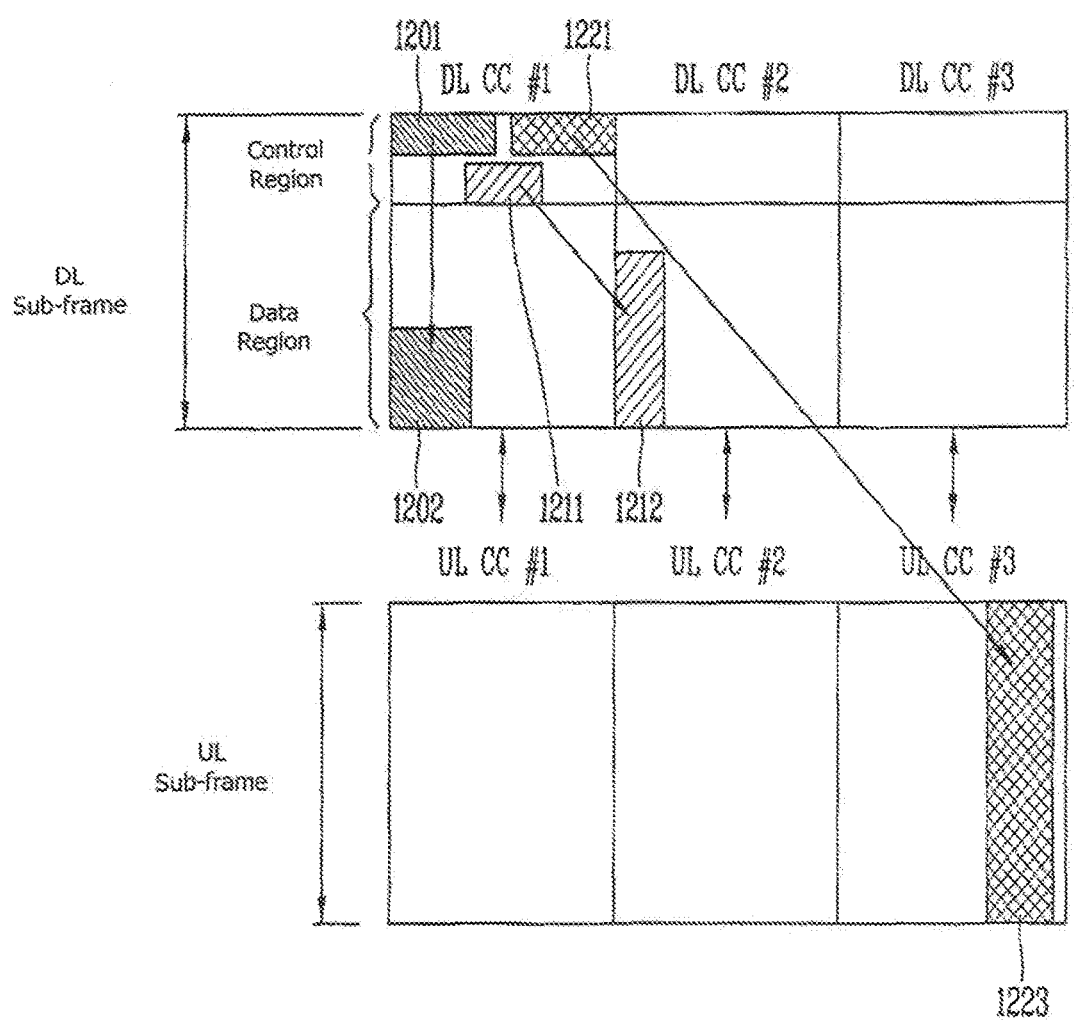
FIG. 12 is a diagram illustrating an example of cross-carrier scheduling.

FIG. 12 is a diagram illustrating an example of the cross-carrier scheduling.

It is assumed that DL CC #1 and UL CC #1 are linked with each other, DL CC #2 and UL CC #2 are linked with each other, and DL CC #3 and UL CC #3 are linked with each other.

A first PDCCH 1201 of the DL CC #1 carries DCI for a PDSCH 1202 of the same DL CC #1. A second PDCCH 1211 of the DL CC #1 carries DCI for a PDSCH 1212 of the DL CC #2. A third PDCCH 1221 of the DL CC #1 carries DCI for a PUSCH 1222 of the UL CC #3 not linked with the DL CC #1.

To perform the cross-carrier scheduling, the DCI of the PDCCH may include a carrier indicator field (CIF). The CIF indicates the DL CC or UL CC scheduled through the DCI. For example, the second PDCCH 1211 may include a CIF indicating the DL CC #2. The third PDCCH 1221 may include a CIF indicating the UL CC #3.

Alternatively, the CIF of the third PDCCH 1221 does not indicate the value of the CIF corresponding to the UL CC but may indicate the value of the CIF corresponding to the DL CC.

That is, the CIF of the third PDCCH 1221 indicates the DL CC #3 linked with the UL CC #3, so as to indirectly indicate the UL CC #3 scheduled by the PUSCH. If the DCI of the PDCCH includes PUSCH scheduling and CIF indicates the DL CC, the UE can determine that the PUSCH scheduling is PUSCH scheduling on the UL CC linked with the DL CC. Accordingly, it is possible to indicate a larger number of CCs as compared with the method of indicating all DL/UL CCs using a CIF having a limited bit length (e.g., CIF having a length of 3 bits).

The UE using the cross-carrier scheduling necessarily monitors PDCCHs of a plurality of scheduled CCs with respect to the same DCI format in the control region of one scheduled CC. For example, if the transmission modes of the plurality of DL CCs are different from one another, the UE may monitor a plurality of PDCCHs with respect to different DCI format in each of the DL CCs. If the bandwidths of the DL CCs are different from one another even though the same transmission mode is used, the sizes of payloads the same DCI format are different from one another, and therefore, the UE may monitor a plurality of PDCCHs.

Consequently, when the cross-carrier scheduling is possible, the UE necessarily monitor PDCCHs for a plurality of DCI in the control region of a monitoring CC according to the transmission mode and/or bandwidth for each CC. Thus, to support this, there is required the configuration of a search space and PDCCH monitoring.

First, in the multiple carrier system, the following terms are defined.

UE DL CC set: Set of DL CCs scheduled for the UE to receive PDSCH.

UE UL CC set: Set of UL CCs scheduled for the UE to transmit PUSCH.

PDCCH monitoring set refers to at least one set of DL CCs, which performs PDCCH monitoring. The PDCCH monitoring set may be the same as the UE DL CC set or may be a subset of the UE DL CC set. The PDCCH monitoring set may include at least one of DL CCs within the UE DL CC set. Alternatively, the PDCCH monitoring set may be separately defined regardless of the UE DL CC set. The UL CCs included in the PDCCH monitoring set may be set so that the self-scheduling for linked UL CCs is always possible.

The UE DL CC set, the UE UL CC set and the PDCCH monitoring set may be configured as cell-specific or UE-specific sets.

Also, the CIF may be included in a DCI format as follows:
If CRS is scrambled into P-RNTI, RA-RNTI or TC-RNTI, the DCI format does not include CIF.
If the CRS is scrambled by C-RNTI, SPC-RNTI, a DCI formats 0, 1, 1A, 1B, 1D, 2, 2A, 2B capable of being received by UE may include CIF.

Figure 13:
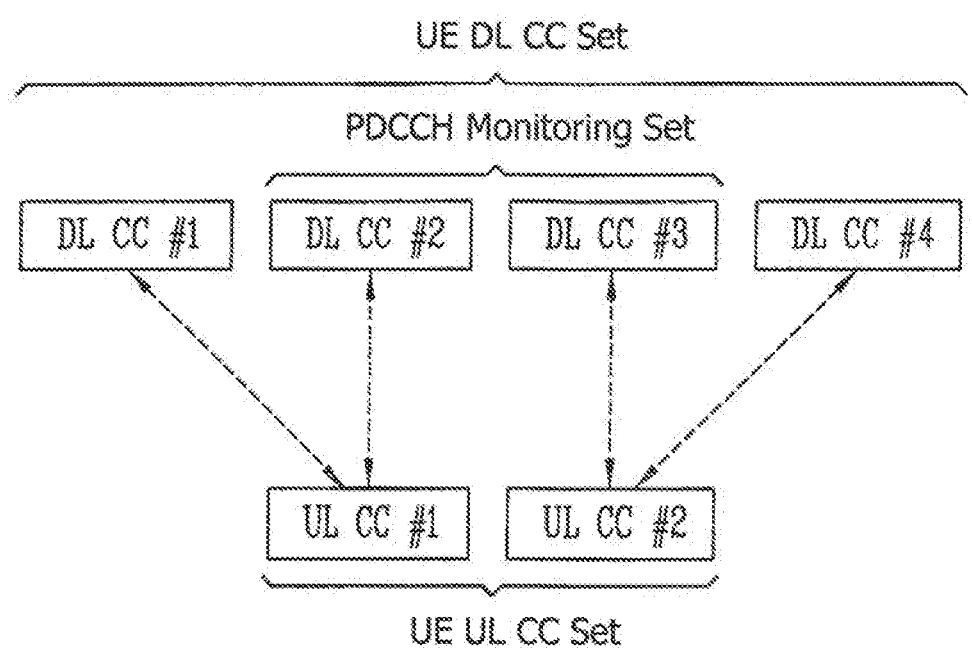
FIG. 13 is a diagram illustrating an example of a component carrier (CC) set.

FIG. 13 illustrates an example of the CC set. It is assumed that four CL CCs (DL CC #1, #2, #3 and #4) as the UE DL CC set, two UL CCs (UL CC #1 and #2) as the UE UL CC set, and two DL CCs (DL CC #2 and #3) as the PDCCH monitoring set are allocated to the UE.

The DL CC #2 in the PDCCH monitoring set transmits PDCCH for PDSCH of the DL CC #1/#2 in the UE UL CC set. The DL CC #3 in the PDCCH monitoring set transmits PDCCH for PDSCH of the DL CC #3/#4 in the UE DL CC set and PDCCH for PUSCH of the UL CC #2 in the UE UL CC set.

The linkage between CCs included in the UE DL CC set, the UE UL CC set and the PDCCH monitoring set may be configured. In the example of FIG. 13, the PDCCH-PDSCH linkage is configured between the DL CC #2 that is a scheduling CC and the DL CC #1 that is a scheduled CC, and the PDCCH-PUSCH linkage is configured between the DL CC #2 and the UL CC #1 is configured. The PDCCH-PDSCH linkage is configured between the DL CC #3 that is a scheduling CC and the DL CC #4 that is a scheduled CC, and the PDCCH-PUSCH linkage is configured between the DL CC #3 and the UL CC #2. The BS may inform the UE of information on the scheduling CC or information on the PDCCH-PDSCH/PUSCH linkage through cell-specific signaling or UE-specific signaling.

Alternatively, both the DL CC and UL CC may not be linked with each other with respect to each of the DL CCs in the PDCCH monitoring set. After the DL CC in the PDCCH monitoring set and the DL CC in the UE DL CC set are linked with each other, the UL CC for PUSCH transmission may be limited to the UL CC linked with the DL CC in the UE DL CC set.

CIFs may be set different from one another according to the linkage of the UE DL CC set, the UE UL CC set and the PDCCH monitoring set.

Hereinafter, semi-persistent scheduling (SPS) will be described in brief.

SPS (Semi-Persistent Scheduling)

The SPS refers to a scheme for reducing overhead caused by repetitive scheduling when traffic such as VoIP or streaming is periodically generated with a required intermediate/low data rate, and reserving resources in advance.

In the SPS scheme, resources are dynamically allocated at every subframe through scheduling when general unicast data traffic is generated, but resources are reserved in advance for the purpose of stable resource allocation when traffic such as VoIP or streaming is generated.

In the current LTE system, DL/UL SPS specifies, to the terminal, in which subframes SPS transmission or reception is performed (at a subframe interval) through radio resource control (RRC) signaling, and the activation and deactivation of actual SPS are performed through PDCCH.

That is, although the SPS is allocated through the RRC signaling, the terminal does not immediately perform SPS TX/RX, but starts performing the SPS TX/RX with an offset at the frame interval allocated through the RRC signaling by allocating a frequency resource according to the RB allocation specified in the PDCCH and applying modulation and code rate according to MCS information, when the terminal receives PDCCH (PDCCH in which SPS C-RNTI is detected) informing the terminal of activation (or reactivation). When receiving PDCCH informing the terminal of deactivation, the terminal stops the SPS TX/RX being performed.

When receiving PDCCH informing the terminal of activation (or reactivation), the terminal restarts the stopped SPS TX/RX with the offset at the subframe interval allocated through the RRC signaling according to the RB allocation, MCS, etc., specified in the PDCCH.

The resource, MCS, etc., to be used in retransmission of PDSCH and PUSCH may be changed in the activated SPS.

The PDCCH CRC-scrambled using the SPS C-RNTI is divided into the following two kinds.

1. PDCCH for SPS activation/release
2. SPS Data retransmission grant

Figure 14:
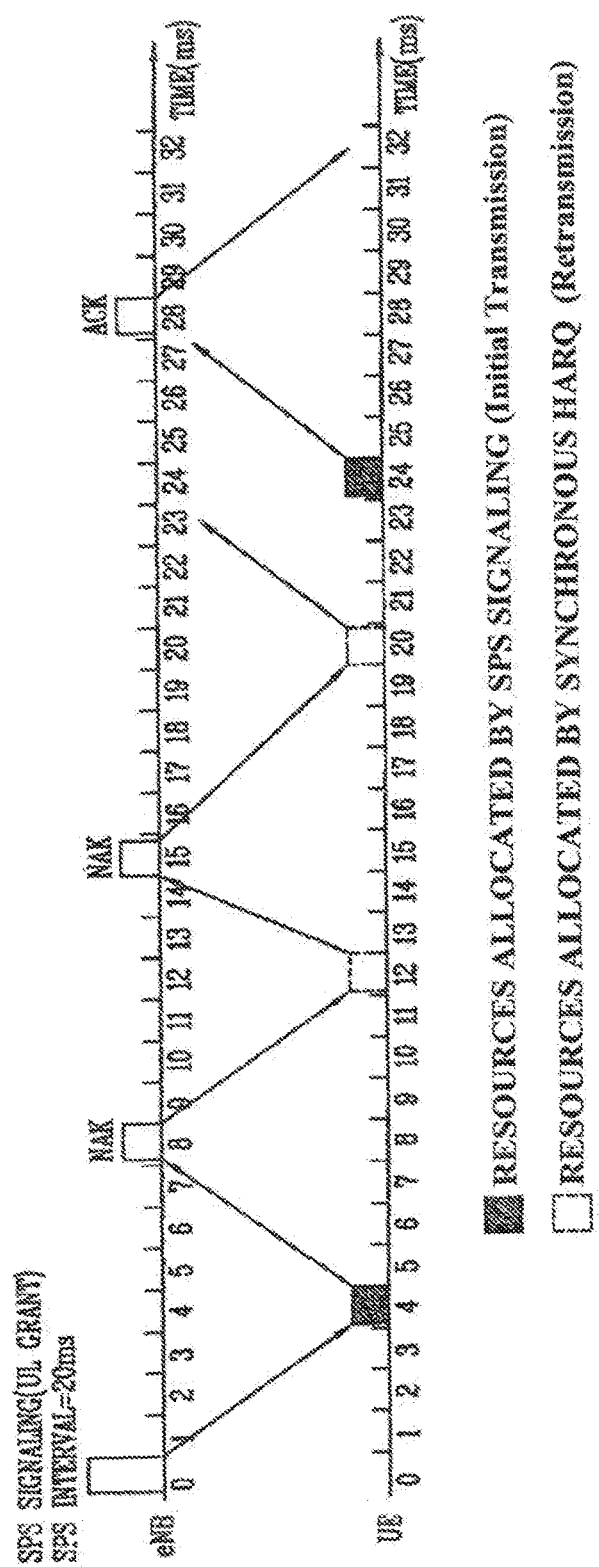
FIG. 14 is a diagram illustrating an operation in a general uplink semi-persistent scheduling (SPS) scheme.

FIG. 14 is a diagram illustrating an operation in a general uplink SPS scheme.

Referring to FIG. 14, it is assumed that the resource allocation interval of SPS is 20 ms.

When receiving SPS signaling through RRC and receiving an activation message on SPS through PDCCH from the base station, the terminal transmits SPS data at every 20 ms through uplink.

That is, as shown in FIG. 14, the terminal receives a specific RB as SPS data from the base station at an interval of 20 ms from after receiving a UL grant message through the SPS signaling.

After initial transmission is performed using a UL synchronous HARQ scheme, the terminal reserves a resource for retransmission at every 8 ms. Here, the reserved resource for retransmission may be used when the terminal succeeds in transmission.

Hereinafter, a method of configuring cross-carrier scheduling by applying CIF to DCI format 0/1A to be transmitted to CSS according to an embodiment of the present invention will be described in detail.

In addition, a method of determining the presence of cross-scheduling of PDCCH related to SPS transmission regardless of the kind of SS to which the PDCCH is transmitted and applying CIF will be described in detailed.

First Embodiment

The first embodiment illustrates a case where when the CRC of PDCCH is scrambled (or masked) by C-RNTI/SPS C-RNTI, CIF is not contained in DCI format 0/1A transmitted on CCS (No CIF on DCI format 0/1A on CSS when CRC is scrambled by C-RNTI/SPS C-RNTI).

Figure 15:
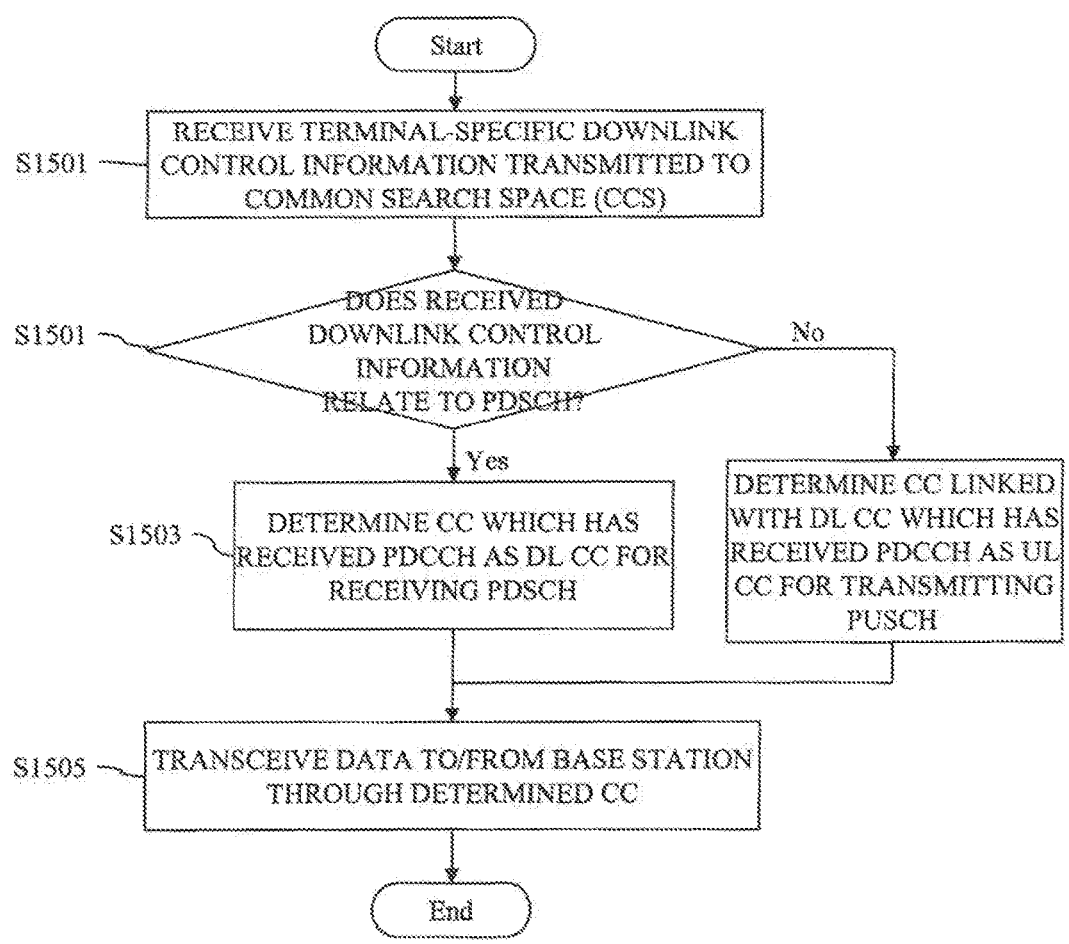
FIG. 15 is a flowchart illustrating a method of allowing CIF not to be included in DCI format 0/1A transmitted on CSS and allowing cross-carrier scheduling not to be used according to a first embodiment of the present disclosure.

FIG. 15 is a flowchart illustrating a method of allowing CIF not to be included in DCI format 0/1A transmitted on CSS and allowing cross-carrier scheduling not to be used according to the first embodiment of the present disclosure.

First, a terminal receives UE-specific DCI transmitted to CSS from a base station (S1501).

The UE-specific DCI refers to DCI format 0/1A.

In the UE-specific DCI, CRC is masked (or scrambled) by C-RNTI/SPS C-RNTI.

The terminal acquires resource allocation information from the received DCI format 0/1A.

If the acquired resource allocation information relates to PDSCH (S1502), the terminal receives PDSCH from the base station through DL CC which has received PDCCH (S1503). If the acquired resource allocation information relates to PUSCH, the terminal transmits the PUSCH through UL CC linked to the DC CC which has received the PDCCH (S1504).

That is, the terminal receives, from the base station, the DCI format 0/1A containing no CIF in the CSS of a series of primary CCs (PCCs) or DL CCs in a PDCCH monitoring set from the base station.

The terminal may tranceive data to/from the base station through the DL CC which has received the PDCCH and the UL CC linked to the DL CC, using the PDSCH and PUSCH allocated from the DCI format 0/1A (S1505).

According to the first embodiment, there is provided a method of allowing CIF not to be contained in PDCCH DCI formats related to SPS transmission and allowing cross-carrier scheduling not to be used, regardless of the kind of search space (SS) to which the PDCCH is transmitted.

That is, in a case where the CIF is not contained in the PDCCH related to the SPS transmission, the terminal operates as follows.

It is determined that the PDSCH/PUSCH indicated by the PDCCH related to the SPS transmission are transmitted through the DL CC which has received the PDCCH and the UL CC linked with the DL CC. Thus, the terminal receives the PDSCH from the base station through each of the DL CC and UL CC and transmits the PUSCH to the base station It is determined that the PDSCH/PUSCH indicated by the PDCCH related to the SPS transmission are transmitted through predetermined specific CCs (applied to both DL/UL) such as PCCs limited to the specific CCs or PCC set. Thus, the terminal receives the PDSCH through each of the DL CC and UL CC and transmits the PUSCH.

Here, the terminal may previously acquire information on the predetermined specific CCs (applied to both DL/UL) such as PCCs limited to the specific CCs or PCC set through upper layer signaling.

Therefore, in a case where the PDCCH related to the SPS is transmitted, the PDSCH/PUSCH indicated by the PDCCH may be transmitted only through specific CCs such as PCC, DL CCs capable of monitoring PCCCH, such as PDCCH monitoring set and BC CC, or UL CCs linked with the DL CCs.

Thus, the terminal performs blind decoding on the DCI format 0/1A masked using the C-RNTI or SPS C-RNTI transmitted to the CSS only through the DL CC capable of monitoring the PDCCH, such as PCC or PDCCH monitoring set.

That is, the PDCCH related to the SPS is transmitted only through a predetermined specific CC such as PCC.

As such, the PDCCH related to the SPS containing no CIF is transmitted only through a predetermined specific CC such as PCC regardless of the kind of SS. Accordingly, when decoding the DCI format 0/1A transmitted to the CSS, the terminal performs channel decoding on a DCI format payload containing no CIF.

As described above, the PDCCH masked using the SPS C-RNTI may be used for 1) SPS activation or release and 2) SPS retransmission grant.

According to the first embodiment, the PDCCH masked using the SPS C-RNTI does not allow the cross-carrier scheduling for the purpose of the two usages.

Figure 16:
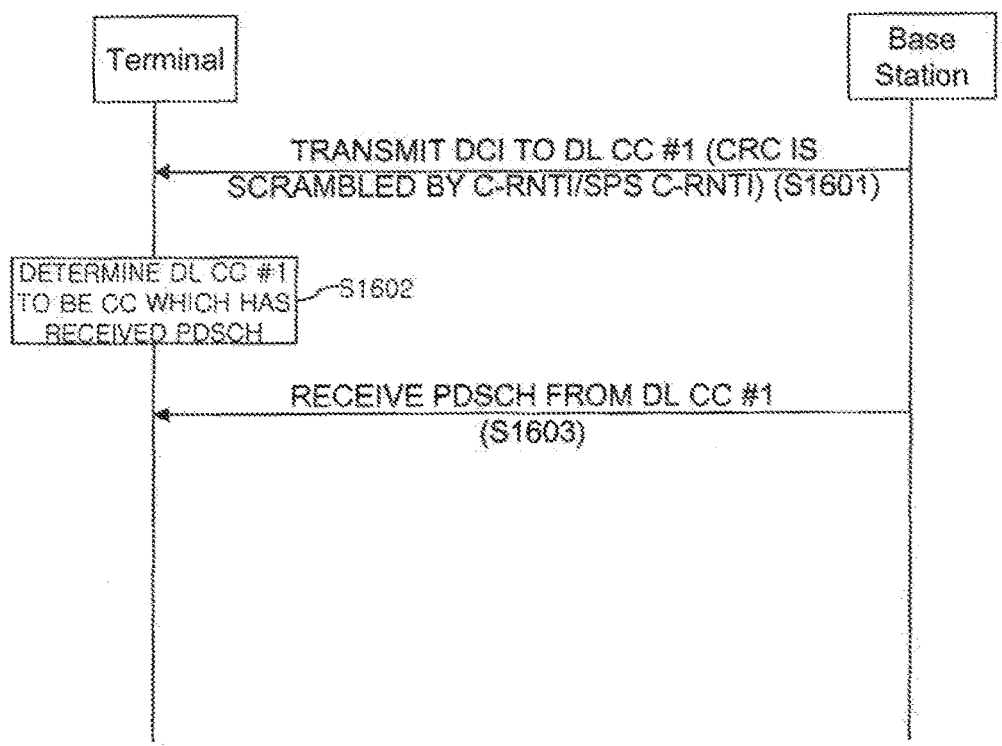
FIG. 16 is a diagram illustrating an example in which PDSCH is transmitted using CC on which DCI containing no CIF is transmitted according to the first embodiment of the present disclosure.

FIG. 16 is a diagram illustrating an example in which PDSCH is transmitted using CC on which DCI containing no CIF is transmitted according to the first embodiment of the present disclosure.

Referring to FIG. 16, the base station transmits DCI through DL CC #1. Here, the DCI format may be 0 or 1A. The DCI has CRC masked using C-RNTI or SPS C-RNTI, and does not contain CIF.

When receiving the DCI from the base station, the terminal determines DL CC #1 as a CC to receive PDSCH, and receives the PDSCH from the base station through the determined DL CC #1.

Figure 17:
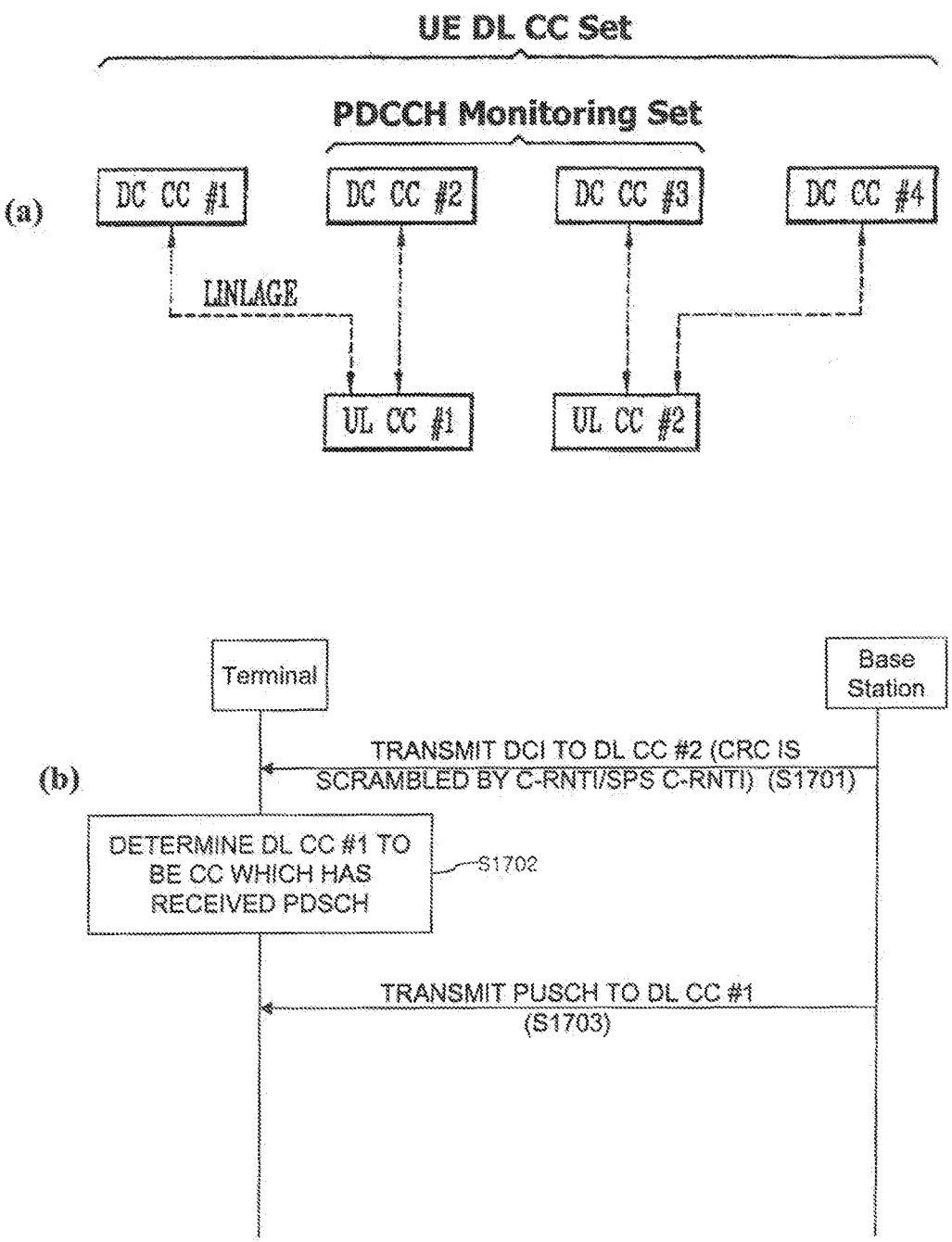
FIG. 17 illustrates a linkage relationship between DL CC and UL CC according to the first embodiment of the present disclosure (a), and a method of transmitting PUSCH using the DL CC and the UL CC linked to the DL CC (b)

FIG. 17 is a diagram illustrating an example in which PUSCH is transmitted using CC on which DCI containing no CIF is transmitted and CC of which linkage is configured according to the first embodiment of the present disclosure.

FIG. 17(a) illustrates a linkage relationship between DL CC and UL CC according to the first embodiment of the present disclosure, and FIG. 17(b) illustrates a method of transmitting PUSCH using the DL CC and the UL CC linked to the DL CC.

Referring to FIG. 17(a), it can be seen that four DL CCs (DL CCs #1, #2, #3 and #4) as a UE DL CC set, two UL CCs (UL CCs #1 and #2) as a UE UL CC set and two DL CCs (DL CCs #2 and #3) as a PDCCH monitoring set are allocated to the terminal.

Linkages between the CCs included in the UE DL CC set, the UE UL CC set and the PDCCH monitoring set may be configured. In the example of FIG. 17(a), the UL CC #1 is linked with the DL CCs #1 and #2, and the UL CC #2 is linked with the DL CCs #3 and #4.

The base station may inform the terminal of information on the linkage between the DL CC and UL CC through cell-specific signaling or UE-specific signaling.

Referring to FIG. 17(b), the base station transmits DCI to the terminal through the DL CC #2. The DCI format may be 0 or 1A. The DCI has CRC masked using C-RNTI or SPS C-RNTI, and does not contain CIF.

When receiving the DCI from the base station, the terminal determines the UL CC #1 linked with the DL CC #2 as a CC to transmit PUSCH, and transmits the PUSCH to the base station through the determined UL CC #1.

Second Embodiment

On the contrary to the first embodiment, the second embodiment illustrates a case where when the CRC of PDCCH is scrambled (or masked) by C-RNTI/SPS C-RNTI, CIF is contained in DCI format 0/1A transmitted on CCS (CIF on DCI format 0/1A on CSS when CRC is scrambled by C-RNTI/SPS C-RNTI).

That is, the second embodiment illustrates a case where cross-carrier scheduling is used by allowing the CIF to be contained in the DCI format 0/1A.

In other words, the DCI format 0/1A containing the CIF may be transmitted to the CSS through a series of PCCs or DL CCs of the PDCCH monitoring set, and the PDSCH/PUSCH allocated from the DCI format 0/1A may be transmitted through DL/UL CC indicated in the CIF of the PDCCH.

Therefore, the terminal performs channel decoding on a DCI format payload containing CIF even when performing blind decoding on the DCI format 0/1A masked using the C-RNTI/SPS C-RNTI transmitted to the CCS of the DL CC capable of monitoring the PDCCH such as PCC or PDCCH monitoring set.

In relation to SPS transmission using SPS C-RNTI, the SPS transmission is performed using all DL CCs allocated to the terminal (not only DL CCs in the PCC or PDCCH monitoring set).

In the second embodiment, the CIF can be contained in all DCI formats so as to allow the cross-carrier scheduling for SPS transmission.

However, the CIF contained according to the function of the PDCCH related to the SPS (whether the PDCCH is used for SPS activation or release or for retransmission grant) may be a field.

That is, in a case where the PDCCH related the SPS is used for the SPS activation, the cross-carrier scheduling of SPS data can be supported using the CIF. However, in a case where the PDCCH related the SPS is used for the retransmission grant, retransmission and initial packets must be transmitted through the same CC, and hence the CIF contained in the PDCCH for retransmission grant does not perform any function.

Accordingly, there may be used a method in which the CIF is not explicitly contained in the PDCCH DCI format related to the SPS (the CIF is not explicitly transmitted using a fixed position regardless of the kind of DCI format of 3 bits) but is implicitly transmitted in an embedded format without any bit to be added.

In the method of allowing the CIF to be contained in the retransmission SPS in the embedded format, if the field unused as a reserved field exists in SPS activation PDCCH DCI, the corresponding field can be used.

Third Embodiment (CIF Only on SPS Activation/Release PDCCH)

The third embodiment provides a method of allowing cross-carrier scheduling to be performed by containing CIF in only PDCCH used for SPS activation or release, which is transmitted to CSS, and allowing the cross-carrier scheduling not to be performed by containing no CIF in PDCCH used for the other SPS operations such as PDCCH used for retransmission grant, which is transmitted to the CSS.

Thus, the terminal performs blind decoding on a payload containing CIF so as to receive the PDCCH used for the SPS activation or release in the CSS. The terminal performs blind decoding on a payload containing no CIF so as to receive the PDCCH used for the retransmission grant to be received in the CCS.

Through the method of the third embodiment, the CIF may be contained in only the PDCCH used for SPS activation/re-activation/release, and may not be contained in the PDCCH for retransmission grant, regardless of the kind of SS to which the PDCCH is transmitted.

Alternatively, the CIF may be contained in only the PDCCH used for SPS activation/re-activation/release, and may be contained in the PDCCH for retransmission grant, regardless of the kind of SS to which the PDCCH is transmitted. Here, it may be interpreted that the CIF may be used for another purpose except the original purpose.

Although the CIF is contained in the PDCCH for retransmission grant, retransmission and initial packets must be transmitted through the same CC, and hence the CIF contained in the PDCCH for retransmission grant does not perform any function.

In this case, unlike a general interpretation method, the CIF contained in the PDCCH for retransmission grant may be interpreted as follows.

Inform the terminal of the difference between a retransmitted CC and a currently transmitted CC using SPS
Interpret the CIF as a CIF of CC to which the PDSCH indicated by the retransmission grant is transmitted
Transmit newly added information related to HARQ using CIF in LTE (Rel-8)

Fourth Embodiment (No CIF on SPS Activation/Release PDCCH)

On the contrary to the third embodiment, the fourth embodiment provides a method of allowing cross-carrier scheduling not to be performed by containing no CIF in PDCCH used for SPS activation or release, which is transmitted to CSS, and allowing the cross-carrier scheduling to be performed by containing CIF in PDCCH used for the other SPS operations such as PDCCH used for retransmission grant, which is transmitted to the CSS.

Figure 18:
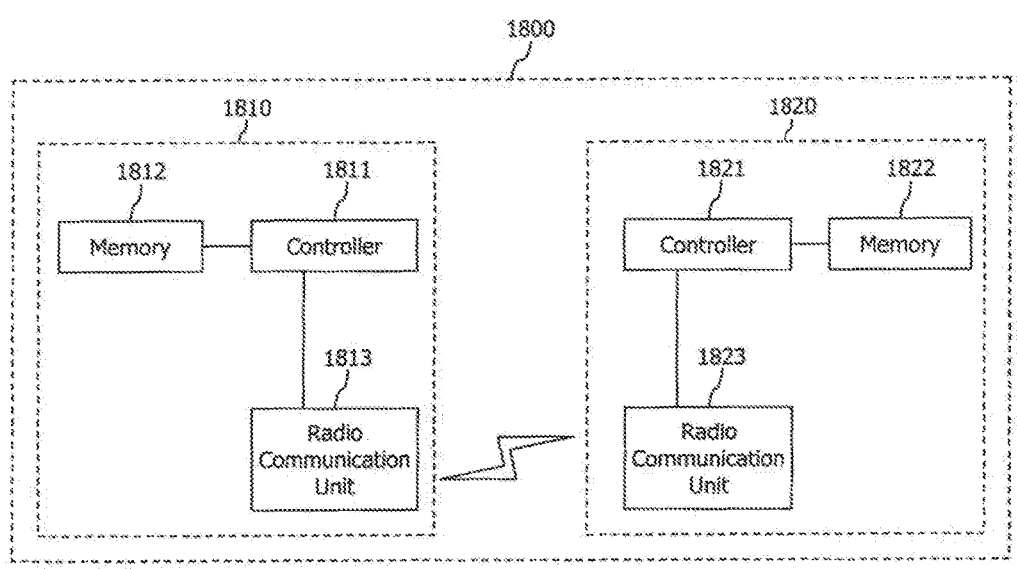
FIG. 18 is a block diagram illustrating a wireless communication system according to an embodiment of the present disclosure.

FIG. 18 is a block diagram illustrating a wireless communication system according to an embodiment of the present disclosure.

A BS 1810 includes a control unit 1811, a memory 1812 and a radio frequency (RF) unit 1813.

The control unit 1811 implements a proposed function, procedure and/or method. The layers of the radio interface protocol may be implemented by the control unit 1811.

The control unit 1811 may operate multiple carriers and configure CIFs.

The memory 1812 is connected to the control unit 1811 so as to store protocols or parameters for operating the multiple carriers. The RF unit 1813 is connected to the control unit 1811 so as to transmit and/or receive radio signals.

A UE 1820 includes a control unit 1821, a memory 1822 and an RF unit 1823.

The control unit 1821 implements a proposed function, procedure and/or method. The layers of the radio interface protocol may be implemented by the control unit 1821. The control unit 1821 may operate multiple carriers and use cross-carrier scheduling on the multiple carriers, based on CIFs.

The memory 1812 is connected to the control unit 1821 so as to store protocols or parameters for operating the multiple carriers. The RF unit 1821 is connected to the control unit 1821 so as to transmit and/or receive radio signals.

The control unit 1811 or 1821 may include an application-specific integrated circuit (ASIC), a chip set, a logical circuit and/or a data processing device. The memory 1812 or 1822 may include a read-only memory (ROM), a random access memory (RAM), a flash memory, a memory card, a storage medium and/or a storage device. The RF unit 1813 or 1823 may include a baseband circuit for processing a radio signal. When the embodiment is implemented using software, the aforementioned technique may be implemented using a module (process, function, etc.) performing the aforementioned functions. The module may be stored in the memory 1812 or 1822, and may be executed by the control unit 1811 or 1821. The memory 1812 or 1822 may exist inside or outside the control unit 1811 or 1821, and may be connected to the control unit 1811 or 1821 using various well-known means.

The invention claimed is:

1. A method for transceiving data with a base station in a system which supports a plurality of component carriers, the method performed by a user equipment (UE) and comprising:
    receiving, from a base station, a physical downlink control channel (PDCCH) including control information allocating resources, wherein the control information is scrambled by a semi-persistent scheduling cell radio network temporary identifier (SPS C-RNTI); and
    transceiving data with the base station through a component carrier based on the control information,
    wherein when the control information includes a carrier indicator field (CIF) and the control information is set for an SPS activation or an SPS release, the PDCCH is only received in a common search space (CSS).

2. The method according to claim 1, wherein when the control information does not include the CIF, the UE monitors a UE-specific search space (USS) and the CSS in order to receive the PDCCH.

3. The method according to claim 1, wherein when the control information does not include the CIF, the UE monitors a UE-specific search space (USS) only in order to receive the PDCCH.

4. The method according to claim 1, wherein the component carrier is a primary component carrier where the PDCCH is received.

5. The method according to claim 1, wherein a cross carrier scheduling within the component carriers is enabled when the CIF is included in the control information.

6. The method according to claim 1, wherein the control information is downlink control information (DCI) for a physical uplink shared channel (PUSCH) scheduling or a physical downlink shared channel (PDSCH) scheduling.

7. A user equipment (UE) for transceiving data with a base station in a system which supports a plurality of component carriers, the UE comprising:
    a radio communication unit; and
    a processor,
    wherein the processor controls the radio communication unit to:
        receive, from a base station, a physical downlink control channel (PDCCH) including control information allocating resources, wherein the control information is scrambled by a semi-persistent scheduling cell radio network temporary identifier (SPS C-RNTI); and transceive data with the base station through a component carrier based on the control information, wherein when the control information includes a carrier indicator field (CIF) and the control information is set for an SPS activation or an SPS release, the PDCCH is only received in a common search space (CSS).

8. The UE according to claim 7, wherein when the control information does not include the CIF, the UE monitors a UE-specific search space (USS) or the CSS in order to receive the PDCCH.

9. The UE according to claim 7, wherein when the control information does not include the CIF, the UE monitors a UE-specific search space (USS) only in order to receive the PDCCH.

10. The UE according to claim 7, wherein the component carrier is a primary component carrier where the PDCCH is received.

11. The UE according to claim 7, wherein a cross carrier scheduling within the component carriers is enabled when the CIF is included in the control information.

12. The UE according to claim 7, wherein the control information is downlink control information (DCI) for a physical uplink shared channel (PUSCH) scheduling or a physical downlink shared channel (PDSCH) scheduling.

* * * * *